(12) United States Patent
Mizutani et al.

(10) Patent No.: US 9,593,250 B2
(45) Date of Patent: Mar. 14, 2017

(54) AQUEOUS INK, INK CARTRIDGE AND INK JET RECORDING METHOD

(71) Applicant: CANON KABUSHIKI KAISHA, Tokyo (JP)

(72) Inventors: Takakazu Mizutani, Kawasaki (JP); Koichi Suzuki, Yokohama (JP); Ryuji Higashi, Kawasaki (JP); Taiki Watanabe, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/749,820

(22) Filed: Jun. 25, 2015

(65) Prior Publication Data
US 2015/0376427 A1    Dec. 31, 2015

(30) Foreign Application Priority Data
Jun. 30, 2014    (JP) ................. 2014-133779

(51) Int. Cl.
| | | |
|---|---|---|
| *C09D 11/322* | (2014.01) | |
| *C09C 1/36* | (2006.01) | |
| *C09C 1/56* | (2006.01) | |
| *C09C 3/00* | (2006.01) | |
| *C09C 3/06* | (2006.01) | |
| *C09C 3/08* | (2006.01) | |
| *C09C 1/02* | (2006.01) | |
| *C08K 9/04* | (2006.01) | |

(52) U.S. Cl.
CPC ............ *C09D 11/322* (2013.01); *C09C 1/021* (2013.01); *C09C 1/024* (2013.01); *C09C 1/3661* (2013.01); *C09C 1/3669* (2013.01); *C09C 1/3692* (2013.01); *C09C 1/56* (2013.01); *C09C 3/006* (2013.01); *C09C 3/063* (2013.01); *C09C 3/08* (2013.01); *C01P 2004/51* (2013.01); *C01P 2004/62* (2013.01); *C01P 2004/64* (2013.01); *C01P 2006/12* (2013.01); *C01P 2006/19* (2013.01); *C08K 9/04* (2013.01)

(58) Field of Classification Search
CPC .............................. C09D 11/30; C09D 11/322
See application file for complete search history.

(56) References Cited

U.S. PATENT DOCUMENTS

| | | |
|---|---|---|
| 5,707,432 A | 1/1998 | Adams et al. |
| 5,803,959 A | 9/1998 | Johnson et al. |
| 5,851,280 A | 12/1998 | Belmont et al. |

(Continued)

FOREIGN PATENT DOCUMENTS

| | | |
|---|---|---|
| JP | H10-510861 A | 10/1998 |
| JP | 2000-512329 A | 9/2000 |

(Continued)

*Primary Examiner* — Veronica F Faison
(74) *Attorney, Agent, or Firm* — Fitzpatrick, Cella, Harper & Scinto

(57) ABSTRACT

The invention provides an aqueous ink containing a coloring material, wherein the coloring material is a self-dispersible pigment in which a functional group containing another atomic group and an anionic group such as a carboxylic acid group, a sulfonic acid group, a phosphoric acid group or a phosphonic acid group are bonded to a particle surface of a pigment such as carbon black or an organic pigment, and a standard deviation of an introduced amount of the functional group is 0.0380 or less.

20 Claims, 2 Drawing Sheets

(56) References Cited

U.S. PATENT DOCUMENTS

| | | |
|---|---|---|
| 5,885,335 A | 3/1999 | Adams et al. |
| 5,900,029 A | 5/1999 | Belmont et al. |
| 6,042,643 A | 3/2000 | Belmont et al. |
| 6,494,946 B1 | 12/2002 | Belmont et al. |
| 6,521,034 B1 | 2/2003 | Osumi et al. |
| 6,528,146 B2 | 3/2003 | Okuda et al. |
| 6,547,381 B2 | 4/2003 | Watanabe et al. |
| 6,585,366 B2 | 7/2003 | Nagata et al. |
| 6,706,105 B2 | 3/2004 | Takada et al. |
| 6,740,151 B2 | 5/2004 | Belmont et al. |
| 6,802,925 B2 | 10/2004 | Kobayashi et al. |
| 6,852,156 B2 | 2/2005 | Yeh et al. |
| 6,899,754 B2 * | 5/2005 | Yeh .................. C09D 11/322 106/31.6 |
| 7,005,461 B2 | 2/2006 | Sanada et al. |
| 7,160,376 B2 | 1/2007 | Watanabe et al. |
| 7,235,126 B2 * | 6/2007 | Tani .................. C09D 11/40 106/31.75 |
| 7,294,185 B2 | 11/2007 | Belmont et al. |
| 7,371,274 B2 | 5/2008 | Sanada et al. |
| 7,393,403 B2 | 7/2008 | Lee et al. |
| 7,423,075 B2 | 9/2008 | Ikegami et al. |
| 7,442,753 B2 | 10/2008 | Tsubaki et al. |
| 7,449,513 B2 | 11/2008 | Sato et al. |
| 7,498,364 B2 | 3/2009 | Sato et al. |
| 7,528,179 B2 | 5/2009 | Suda et al. |
| 7,528,182 B2 | 5/2009 | Teshima et al. |
| 7,538,147 B2 | 5/2009 | Sato et al. |
| 7,563,853 B2 | 7/2009 | Tsubaki et al. |
| 7,598,332 B2 | 10/2009 | Ikegami et al. |
| 7,601,790 B2 | 10/2009 | Sato et al. |
| 7,605,192 B2 | 10/2009 | Sanada et al. |
| 7,704,414 B2 | 4/2010 | Sato et al. |
| 7,754,000 B2 | 7/2010 | Nakahama et al. |
| 7,866,806 B2 | 1/2011 | Sato et al. |
| 7,914,616 B2 | 3/2011 | Nakahama et al. |
| 7,964,033 B2 | 6/2011 | Sujeeth et al. |
| 8,007,097 B2 | 8/2011 | Sanada et al. |
| 8,021,471 B2 * | 9/2011 | Palumbo .............. C09B 67/0009 106/31.58 |
| 8,118,924 B2 | 2/2012 | Sujeeth et al. |
| 8,177,902 B2 | 5/2012 | Nakahama et al. |
| 8,226,761 B2 | 7/2012 | Sujeeth et al. |
| 8,450,393 B2 | 5/2013 | Tsubaki et al. |
| 8,580,024 B2 | 11/2013 | Gu |
| 8,672,465 B2 | 3/2014 | Sanada et al. |
| 8,899,736 B2 | 12/2014 | Sanada et al. |
| 2002/0014184 A1 | 2/2002 | Yeh et al. |
| 2003/0095914 A1 | 5/2003 | Belmont et al. |
| 2005/0034629 A1 | 2/2005 | Belmont et al. |
| 2005/0066856 A1 | 3/2005 | Lee et al. |
| 2005/0131102 A1 | 6/2005 | Nakazawa et al. |
| 2005/0197424 A1 | 9/2005 | Higashi et al. |
| 2005/0239918 A1 | 10/2005 | Nakazawa et al. |
| 2006/0050117 A1 | 3/2006 | Sato et al. |
| 2006/0100310 A1 | 5/2006 | Nakazawa et al. |
| 2006/0160975 A1 | 7/2006 | Suda et al. |
| 2006/0250463 A1 | 11/2006 | Nakazawa et al. |
| 2007/0100024 A1 * | 5/2007 | Gu .................. B82Y 30/00 523/160 |
| 2009/0050014 A1 | 2/2009 | Sujeeth et al. |
| 2009/0182076 A1 | 7/2009 | Teshima et al. |
| 2010/0307377 A1 | 12/2010 | Gu |
| 2011/0308430 A1 | 12/2011 | Sujeeth et al. |
| 2012/0033012 A1 * | 2/2012 | Nagai .................. C09D 11/324 347/29 |
| 2012/0118205 A1 | 5/2012 | Sujeeth et al. |
| 2013/0328973 A1 | 12/2013 | Kakikawa et al. |
| 2015/0029241 A1 | 1/2015 | Sanada et al. |
| 2015/0376416 A1 * | 12/2015 | Watanabe .......... C09D 11/322 347/20 |
| 2015/0376426 A1 * | 12/2015 | Watanabe .......... C09D 11/322 347/20 |

FOREIGN PATENT DOCUMENTS

| | | |
|---|---|---|
| JP | 2000-345095 A | 12/2000 |
| JP | 2003-096350 A | 4/2003 |
| JP | 2003-535949 A | 12/2003 |
| JP | 2004-168898 A | 6/2004 |
| JP | 2005-105271 A | 4/2005 |
| JP | 2010-275478 A | 12/2010 |
| JP | 2010-537006 A | 12/2010 |
| JP | 2012-117020 A | 6/2012 |
| JP | 2012-528917 A | 11/2012 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, it has been required to improve an optical density of an image upon printing a business document including characters and diagrams with an ink on a recording medium such as plain paper. It is advantageous from the viewpoint of the optical density of the image to use a self-dispersible pigment as a coloring material of the ink. The self-dispersible pigment is mainly produced by a chemical pigment-modifying technology, and an attempt to increase an introduced amount of a functional group is made.

For example, Japanese Patent Application Laid-Open No. 2000-512329, Japanese Patent Application Laid-Open No. 2003-535949 and Japanese Patent Application Laid-Open No. 2012-528917 describe a self-dispersible pigment to which a specified amount of a functional group has been bonded. In addition, Japanese Patent Application Laid-Open No. 2003-096350 describes an ink using a pigment that an average value of zeta potential and a polydisperse index falling within respective specified ranges. Further, Japanese Patent Application Laid-Open No. 2010-275478 describes an ink using a pigment treated with a specified azo compound subsequently to an oxidation treatment.

However, when the conventional self-dispersible pigments described in Japanese Patent Application Laid-Open No. 2000-512329, Japanese Patent Application Laid-Open No. 2003-535949, Japanese Patent Application Laid-Open No. 2012-528917, Japanese Patent Application Laid-Open No. 2003-096350 and Japanese Patent Application Laid-Open No. 2010-275478 are used, an image recorded has a high optical density as a measured value. However, uniformity of the image is poor, and the image is in a state unevenness like occurrence of white blur has occurred when visually observed.

SUMMARY OF THE INVENTION

Accordingly, the present invention is directed to providing an aqueous ink capable of recording an image excellent in uniformity. In addition, the present invention is also directed to providing an ink cartridge and an ink jet recording method using the ink.

The above objects can be achieved by the present invention described below. According to one aspect of the present invention, there is thus provided an aqueous ink comprising a coloring material, wherein the coloring material is a self-dispersible pigment in which a functional group containing another atomic group and an anionic group are bonded to a particle surface of a pigment, and a standard deviation of an introduced amount of the functional group is 0.0380 or less.

According to another aspect of the present invention, there can be provided an aqueous ink capable of recording an image excellent in uniformity. In addition, according to still another aspect of the present invention, there can be provided an ink cartridge and an ink jet recording method using the aqueous ink.

Further features of the present invention will become apparent from the following description of exemplary embodiments with reference to the attached drawings.

BRIEF DESCRIPTION OF THE DRAWINGS

FIGS. 2A and 2B schematically illustrate an example of an ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
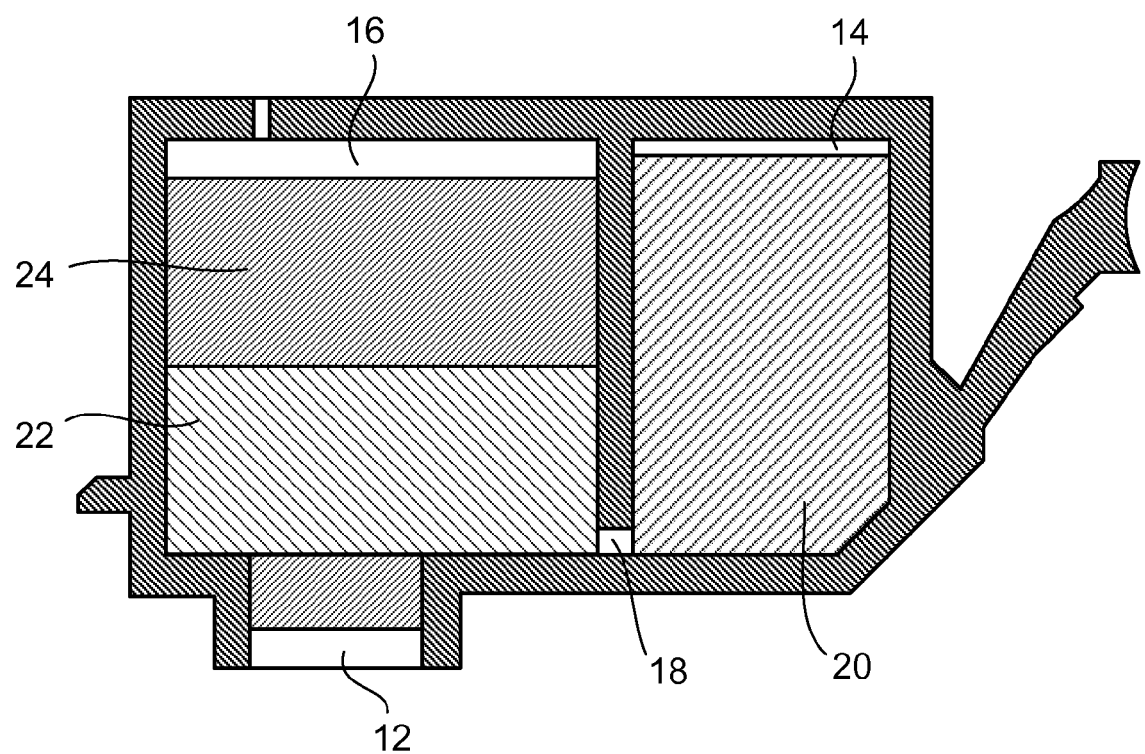
FIG. 1 is a sectional view schematically illustrating an ink cartridge according to an embodiment of the present invention.

Preferred embodiments of the present invention will now be described in detail in accordance with the accompanying drawings. However, the present invention is not limited to the following embodiments. Incidentally, when an anionic group forms a salt, the anionic group may exist in a state dissociated into an ion in an ink. However, such a group is represented as "anionic group" for convenience's sake in the present invention. In addition, a self-dispersible pigment and an aqueous ink may be simply referred to as "a pigment" and "an ink", respectively. In the present invention, a standard deviation of an introduced amount of a functional group in aggregation (what is called a pigment dispersion) of particles of a self-dispersible pigment is referred to as a standard deviation of an introduced amount of a functional group of "the self-dispersible pigment" for convenience's sake.

The present inventors have carried out an investigation with a view toward improving uniformity of an image recorded with an ink containing a self-dispersible pigment. As a result, it has been found that to make small "a standard deviation of an introduced amount of a functional group" corresponding to a width of a distribution of the introduced amount of the functional group in aggregation (pigment dispersion) of particles of a self-dispersible pigment is more important than the control of the introduced amount of the functional group which has heretofore been utilized for grasping the properties of the self-dispersible pigment.

The fact that the standard deviation of the introduced amount of the functional group is small means that a density of functional groups bonded to individual pigment particles is even. Therefore, the individual pigment particles aggregate at an even aggregation speed in the process that an ink is applied to a recording medium, and an aqueous medium is evaporated, so that the uniformity of the resulting image is improved.

On the other hand, the fact that the standard deviation of the introduced amount of the functional group is large means that pigment particles different in the introduced amount of the functional group are present in plenty. For example, when self-dispersible pigments which have a functional group of the same structure and are different in the introduced amount thereof are compared, easiness of occurrence of steric hindrance in the vicinity of the particle surfaces of the pigments varies according to the introduced amount, so that the degree of solvation with a molecule of a water-soluble organic solvent present in the vicinity of the pigment particles also varies. That is, when the introduced amount of the functional group is small, the water-soluble organic solvent is easy to solvate with the particle surface of the pigment, so that the aggregation speed of the pigment particles becomes slow. When the introduced amount of the functional group is large, the aggregation speed of the pigment particles becomes fast. From such a reason, aggregation speeds of individual pigment particles vary in the process in which an ink is applied to a recording medium, and an aqueous medium is evaporated when a self-dispersible pigment large in the standard deviation of the introduced amount of the functional group is used. Therefore, aggregation of the individual pigment particles unevenly occurs, so that the resulting image becomes such a state that white blur are partly generated, and the uniformity of the image is lowered.

Standard Deviation of Introduced Amount of Functional Group:

A potential difference of an interface in particles dispersed in a liquid is defined by, for example, a surface potential or a Stern potential. The surface potential is a potential difference between an interface of a contact phase and a portion sufficiently distant from an interface of a liquid. In addition, the Stern potential is a potential difference between a Helmholtz plane of a contact phase and a portion sufficiently distant from an interface of a liquid. However, there is no method for actually measuring the surface potential or Stern potential at present. In the present invention, thus, the standard deviation of the introduced amount of the functional group of the self-dispersible pigment is calculated out from a value converted from a distribution of a zeta potential.

The zeta potential means a potential at "a slipping plane" (a boundary plane that can transfer along with it) that is a limit portion where a surface charge influences an ion. The zeta potential can be measured by a method such as "electrophoresis" and is commonly used as a value indicating a potential difference of an interface. The zeta potential of a particle is a physical property value suitable for grasping the degree of surface modification of the particle and the level of dispersion stability by that. Since the zeta potential is a charge amount that the particle has, it can be regarded as being the same as the sum total of an introduced amount of an anionic group in one pigment particle.

The zeta potential can be measured by "an electrophoretic method" measuring an electrophoretic mobility of a particle in an electric field. When an electric field is applied to a quartz cell equipped with electrodes at both ends, the particle moves in a direction of an electrode of a reverse polarity to the polarity of the particle. A moving speed of the particle at this time is measured by a laser beam, whereby a moving speed (electrophoretic mobility) per unit electric field can be determined to obtain a zeta potential by conversion using a Henry's equation.

In addition, a distribution of the zeta potential can be known by a method of analyzing a frequency (Doppler frequency) shifted by a Doppler effect. Simply speaking, when the measurement is conducted by the electrophoretic method, an absolute value of a zeta potential of one pigment particle can be known. Therefore, the number of pigment particles that are measurement object is increased, the distribution of the zeta potential can also be simply known.

The standard deviation $Y_\sigma$ of the introduced amount of the functional group can be calculated out from the introduced amount $Y_A$ (mmol/g) of the functional group, a standard deviation $X_\sigma$ of the zeta potential and the zeta potential $X_A$ (mV) based on the equation: $Y_\sigma = X_\sigma \times Y_A / X_A$. The unit of the standard deviation of the introduced amount of the functional group is the same "mmol/g" as the introduced amount $Y_A$ of the functional group though its description is omitted.

The introduced amount $Y_A$ (mmol/g) of the functional group is a value (average value) determined by a colloid titration method which will be described subsequently. The zeta potential $X_A$ (mV) is a zeta potential value (average value) measured by an electrophoretic method which will be described subsequently. The standard deviation $X_\sigma$ of the zeta potential is a standard deviation determined from a distribution of the zeta potential.

The introduced amount of the functional group is an index indicating an amount of the functional group bonded to the particle surface of the pigment and represented by an amount (mmol) of the functional group per 1 g of the self-dispersible pigment. In the present invention, the introduced amount of the functional group is determined in the following manner. First, the structure of the functional group is identified by simultaneous differential thermal balance mass analysis (TG-MS) or solid state NMR. The introduced amount of an anionic group is then determined by a colloid titration method. Thereafter, the introduced amount of the anionic group is divided by the number of anionic groups contained in one functional group to convert the amount to an introduced amount (mmol) of the functional group per 1 g of the self-dispersible pigment. Therefore, the introduced amount of the functional group comes to be determined as an average value. In Examples which will be described subsequently, the introduced amount of the functional group was calculated out by the colloid titration method under the following conditions.

Apparatus: A potentiometric titration device (trade name "AT-510", manufactured by KYOTO ELECTRONICS MANUFACTURING CO., LTD.), Sample: An aqueous dispersion liquid in which the content of the self-dispersible pigment is 0.01% by mass, and the pH is 8.0±0.2, Titrant: A 5 mmol/l aqueous solution of methyl glycol chitosan, Dropping amount: 0.05 ml, Judgement of end point: An inflection point in potentiometric titration conducted by using an automatic control software (AT-win), and Temperature: 25° C.

The purpose of adjusting the pH of the aqueous dispersion liquid of the self-dispersible pigment to 8.0±0.2 is to keep a dissociated state of the anionic group contained in the functional group of the self-dispersible pigment constant. If the pH of the aqueous dispersion liquid prepared does not fall within the above-described range, it is only necessary to adjust the pH with a 0.1 mol/l aqueous solution of potassium hydroxide or a 0.1 mol/l aqueous solution of hydrochloric acid. Quite naturally, the measuring method of the introduced amount of the functional group is not limited to the above-described method.

The zeta potential is an index indicating the sum total of the introduced amount of the anionic group in one pigment particle. In the present invention, the zeta potential is determined as an average value (mV) of zeta potentials measured about 100 or more self-dispersible pigment particles by the electrophoretic method. In Examples which will be described subsequently, the zeta potential was calculated out by the colloid titration method under the following conditions.

Apparatus: A zeta potential measuring device (trade name "Zetasizer Nano Z" (manufactured by Malvern Instruments), Sample: An aqueous dispersion liquid in which the content of the self-dispersible pigment is 0.01% by mass, and the pH is 8.0±0.2, Cell: Clear disposable zeta cell, and
Temperature: 25° C.

The purpose of adjusting the pH of the aqueous dispersion liquid of the self-dispersible pigment to 8.0±0.2 is to keep a dissociated state of the anionic group contained in the functional group of the self-dispersible pigment constant, thereby stabilizing electrostatic repulsive force by the anionic group. If the pH of the aqueous dispersion liquid prepared does not fall within the above-described range, it is only necessary to adjust the pH with, for example, a 0.1 mol/l aqueous solution of potassium hydroxide or a 0.1 mol/l aqueous solution of hydrochloric acid. Quite naturally, the measuring method of the zeta potential is not limited to the above-described method. The apparatus may be any apparatus so far as the zeta potential can be measured by the electrophoretic method. Specifically, those of the following trade names: ELS-Z2 (manufactured by Otsuka Electronics Co., Ltd.), ZEECOM ZC-3000 (manufactured by Microtec-Nichion Co., Ltd.), Delsa Nano C (manufactured by BECKMAN COULTER), ZetaPALS (manufactured by Brookhaven Instruments) and UPA-UZ152 (manufactured by NIKKISO CO., LTD.) may also be used.

The standard deviation of the zeta potential is represented by the positive square root of the variance calculated out from the zeta potentials of 100 or more self-dispersible pigment particles as measured in the above-described manner. The unit of the standard deviation of the zeta potential is the same mV as the zeta potential though its description is omitted.

Although the measuring methods of the introduced amount of the functional group and the zeta potential using the aqueous dispersion liquid of the self-dispersible pigment have been described above, these can also be measured likewise by using an aqueous dispersion liquid prepared by utilizing a self-dispersible pigment taken out of an ink. In addition, in the interest of accuracy, an aqueous dispersion liquid prepared in the following manner may also be used. An aqueous dispersion liquid or ink containing a self-dispersible pigment produced is diluted with pure water to reduce the content of the self-dispersible pigment to 3.0% by mass or less. Six grams of the resultant liquid is put into a polycarbonate-made tube having capacity of 10 ml. Centrifugation is then conducted for 15 hours at 80,000 rpm by an ultracentrifugal separator (trade name "Optima™ Max-XP Ultra Centrifuge", manufactured by BECKMAN COULTER) to collect a precipitate. The resultant precipitate is diluted with pure water, and its pH is adjusted, as needed, to prepare a measurement sample: an aqueous dispersion liquid in which the content of the self-dispersible pigment is 0.01% by mass.

Ink:

The aqueous ink according to the present invention contains a coloring material. This coloring material is a self-dispersible pigment in which a functional group containing another atomic group and an anionic group are bonded to a particle surface of the pigment, and a standard deviation of an introduced amount of the functional group is 0.0380 or less. Respective components making up the aqueous ink (hereinafter also referred to as "ink" merely) according to the present invention which is also suitable for use in ink jet recording will hereinafter be described in detail.

Self-Dispersible Pigment:

The self-dispersible pigment contained in the ink according to the present invention is such that a functional group containing another atomic group and an anionic group are bonded to a particle surface of the pigment, and a standard deviation of an introduced amount of the functional group is 0.0380 or less. If the standard deviation of the introduced amount of the functional group is more than 0.0380, aggregation of the pigment unevenly occurs because the aggregation speed of the pigment varies, so that the uniformity of the resulting image is not improved. In order to improve the uniformity of the image, the standard deviation of the introduced amount of the functional group is favorably 0.0330 or less. In addition, the standard deviation of the introduced amount of the functional group is favorably 0.0000 or more, more favorably 0.0200 or more.

The introduced amount of the functional group is favorably 0.10 mmol/g or more. If the introduced amount of the functional group is less than 0.10 mmol/g, the dispersion stability of the pigment may be somewhat lowered in some cases to lower the storage stability of the resulting ink. On the other hand, the introduced amount of the functional group is favorably 1.00 mmol/g or less, more favorably 0.80 mmol/g or less.

Pigment Species and Physical Property Values:

As for the pigment constituting the self-dispersible pigment (pigment species), for example, an inorganic pigment such as carbon black, calcium carbonate and titanium oxide, or an organic pigment such as azo, phthalocyanine and quinacridone may be used. Among these, carbon black or the organic pigment is favorably used, and carbon black is particularly favorably used as the pigment because it has more reaction active points on its particle surface than other pigments, and so the introduced amount of the functional group is easy to be increased. As carbon black, any carbon black such as furnace black, lamp black, acetylene black and channel black may be used.

The DBP oil absorption of carbon black is favorably 50 ml/100 g or more and 200 ml/100 g or less, more favorably 120 ml/100 g or more and 170 ml/100 g or less, particularly favorably 120 ml/100 g or more and 150 ml/100 g or less. The DBP oil absorption can be measured by a method conforming to JIS K 6221 or ASTM D 2414. These methods are those in which dibutyl phthalate is added dropwise to 100 g of carbon black under agitation, and then the amount of dibutyl phthalate added is measured at the point of time of the maximum torque.

The specific surface area of carbon black according to the BET method is favorably 100 m$^2$/g or more and 600 m$^2$/g or less. The specific surface area according to the BET method can be measured by a method conforming to JIS K 6217 or ASTM D 6556. These methods are those in which deaerated carbon black is immersed in liquid nitrogen, and then the amount of nitrogen adsorbed on a particle surface of carbon black is measured when having reached the equilibrium.

The primary particle size of carbon black is favorably 10 nm or more and 40 nm or less. Carbon black is generally present in such a state that plural primary particles sterically extend like a bunch of grapes. The primary particle size means a particle size of carbon black (primary particle) of the smallest unit forming one pigment particle. The primary particle size of carbon black can be determined by observing and measuring the particle size of carbon black of the smallest unit forming the pigment particle at about 100 points through a transmission or scanning type electron microscope and calculating the arithmetical mean thereof.

The average particle size of carbon black is favorably 50 nm or more and 200 nm or less. The average particle size means a particle size of carbon black as an ordinarily existing form. In the present invention, the average particle size can be measured as a 50% cumulative value [$D_{50}$ (nm)]

in a volume-based particle size distribution by using a dynamic light scattering type particle size distribution measuring device or the like.

The primary particle size of the organic pigment is favorably 50 nm or more and 150 nm or less. In addition, the average particle size of the organic pigment is favorably 50 nm or more and 250 nm or less. The definitions of the primary particle size and average particle size of the organic pigment are the same as the definitions of the primary particle size and average particle size of carbon black, respectively.

The measurement of the introduced amount of the functional group by the colloid titration method and the measurement of the zeta potential by the electrophoretic method may be affected by the particle size of the pigment in some cases when the particle size is extremely large or small. In order to achieve the ejection properties of an ink jet ink at a high level while improving measurement accuracy, the average particle size ($D_{50}$) of the pigment is favorably 60 nm or more and 120 nm or less. In addition, $D_{90}$ (a 90% cumulative value in the volume-based particle size distribution) of the pigment is favorably 100 nm or more and 300 nm or less.

Functional Group:

The oxidation method using ozone, nitric acid gas, hypohalous acids or peracid has heretofore been known as a pigment-modifying technology. According to such oxidation method, a self-dispersible pigment in which an anionic group has been directly bonded to a particle surface of the pigment can be produced. In the oxidation method, various functional groups are easy to be formed in addition to a carboxylic acid group. In addition, it is difficult to control introduced amounts and distribution of the anionic group and other functional groups, and it is also difficult to make the standard deviation of the introduced amount of the functional group small.

In the self-dispersible pigment used in the ink according to the present invention, the functional group bonded to the particle surface of the pigment contains another atomic group and an anionic group. Such a self-dispersible pigment is produced by chemical pigment modification using a compound having an anionic group. The self-dispersible pigment obtained by such a production process is such that the functional group containing another atomic group and the anionic group is bonded to the particle surface of the pigment. A molecular weight of one functional group is favorably 1,000 or less, more favorably 500 or less.

As examples of the anionic group, may be mentioned a carboxylic acid group, a sulfonic acid group, a phosphoric acid group and a phosphonic acid group. These anionic groups may form a salt. When the anionic group forms a salt, at least one proton of such a group is substituted with a cation. As examples of the cation, may be mentioned an alkali metal ion, an ammonium ion and an organic ammonium ion. As examples of the alkali metal ion, may be mentioned lithium, sodium and potassium ions. As examples of the organic ammonium ion, may be mentioned cations of aliphatic amines such as mono- to tri-alkylamines and aliphatic alcoholamines such as mono- to tri-alkanolamines, and salts thereof. A salt may exist in a state dissociated into an ion in an aqueous ink. However, such a salt is represented as "a salt" for convenience's sake.

As examples of another atomic group, may be mentioned alkylene groups such as methylene, ethylene and propylene groups; arylene groups such as phenylene, naphthylene, anthracenylene, phenanthrenylene and biphenylene groups; heteroarylene groups such as pyridylene, imidazolene, pyrazolene, pyridinylene, thienylene and thiazolylene groups; a carbonyl group; ester groups such as carboxylic acid ester, sulfonic acid ester, phosphoric acid ester and phosphonic acid ester groups; an imino group; an amide group; a sulfonyl group; and an ether group. A group obtained by combining these groups may also be used.

Another atomic group favorably becomes a linking group between the particle surface of the pigment and the anionic group. That is, it is favorable that another atomic group is bonded directly to the particle surface of the pigment, and the anionic group is substituted on another atomic group. In this case, another atomic group may be any group so far as it can modify the pigment into a self-dispersible pigment in relation with the anionic group. That is, if the anionic group substituted is small although the structure of the linking group is large, the hydrophilicity of the functional group bonded to the particle surface of the pigment does not become high, so that the dispersion stability of the resulting self-dispersible pigment may be somewhat lowered in some cases. Accordingly, when the structure of another atomic group is made large, it is favorable that the number of the anionic group is increased, or the introduced amount of the functional group is increased. In the present invention, the number of the anionic group contained in one functional group is favorably 1 or more and 5 or less, more favorably 2 or more and 4 or less.

The self-dispersible pigment may have two functional groups different in structure. As examples thereof, may be mentioned (i) a case where the pigment has such plural kinds of functional groups that another atomic groups are different, and the anionic groups are the same, and (ii) a case where the pigment has such plural kinds of functional groups that another atomic groups are the same, and the anionic groups are different. Among these, a case where one functional group contains two carboxylic acid groups is favorable. As specific examples thereof, may be mentioned (i) a self-dispersible pigment having a functional group containing two carboxylic acid groups and a functional group containing one carboxylic acid group, and (ii) a self-dispersible pigment having a functional group containing two carboxylic acid groups and a functional group containing at least one phosphonic acid group.

The functional group favorably has a structure represented by —R—(COOM$_1$)$_n$ (in which R is another atomic group, M$_1$ is a hydrogen atom, an alkali metal, ammonium or organic ammonium, and n is an integer of 2 or more). The upper limit of n is equal to the number of hydrogen atoms that another atomic group can have and is favorably 5 or less. In particular, a self-dispersible pigment that a pigment species is carbon black, and n is 2 is favorable because the standard deviation of the introduced amount of the functional is easy to become small. In this case, steric hindrance is easy to occur in the vicinity of the particle surface of the pigment, so that a water-soluble organic solvent in an ink becomes hard to solvate with the particle surface of the pigment. As a result, solid-liquid separation quickly occurs in the process that the ink is applied to a recording medium, and an aqueous medium is evaporated. In addition, since an effect to stabilize the dispersion of the pigment by the solvation is also hard to occur, the pigment quickly aggregates, and so the uniformity of the resulting image can be more improved. Such an effect is easier to occur as the introduced amount of the functional group becomes larger. Specifically, the introduced amount of the functional group is favorably 0.10 mmol/g or more and 0.80 mmol/g or less.

Content:

The content (% by mass) of the self-dispersible pigment in the ink is favorably 0.10% by mass or more and 15.00% by mass or less, more favorably 1.00% by mass or more and 10.00% by mass or less, particularly favorably 2.00% by mass or more and 8.00% by mass or less based on the total mass of the ink.

Production Process for Self-Dispersible Pigment:

No particular limitation is imposed on the production process for the self-dispersible pigment so far as the standard deviation of the introduced amount of the functional group can be controlled to 0.0380 or less. As examples thereof, may be mentioned a process of reacting a diazonium salt with a pigment (Japanese Patent Application Laid-Open No. H10-510861), a process of reacting a substituted triazine compound with a pigment (Japanese Patent Application Laid-Open No. 2010-537006) and a process of reacting a halogen compound with a pigment (Japanese Patent Application Laid-Open No. 2005-105271). When these processes are utilized, it is favorably devised to make reaction conditions mild by, for example, adding raw materials at many stages because the standard deviation of the introduced amount of the functional group is easy to become large.

In addition, a process of radicalizing a compound having an anionic group to add it to a pigment may also be mentioned. According to this process, a self-dispersible pigment small in the standard deviation of the introduced amount of the functional group can be efficiently produced, so that a self-dispersible pigment produced by this process is favorably used in the ink according to the present invention. In a process described below, a radical addition reaction to a particle surface of a pigment is caused to efficiently progress without rapidly decomposing a compound used in treatment of the pigment. According to the production process described below, a self-dispersible pigment large in the introduced amount of the functional group and small in the standard deviation of the introduced amount of the functional group can thus be obtained even when the amount of the compound used in the treatment of the pigment is small compared with such conventional production processes for the self-dispersible pigment as mentioned above. Production Processes A, B and C will hereinafter be described as examples of this process.

Production Process A:

In Production Process A, a group $R_1$ in the following general formula (1) is bonded to a particle surface of the pigment by radical addition reaction induced by removal of a hydrogen atom from a compound represented by the general formula (1):

$$HN=N-R_1 \tag{1}$$

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group.

Production Process A is a process for producing a self-dispersible pigment by bonding a group $R_1$ which is a functional group containing an anionic group to a particle surface of the pigment by radical addition reaction induced by removal of a hydrogen atom from a compound (diazene compound) represented by the general formula (1). This radical addition reaction is an oxidative radical addition reaction. In addition, it is favorable in Production Process A that the compound represented by the general formula (1) is formed by removal of a hydrogen atom from a compound (hydrazine compound) represented by the following general formula (1'). That is, a self-dispersible pigment can also be produced by radical addition reaction induced by sequential removal of a hydrogen atom from the compound represented by the general formula (1'):

$$H_2N-NH-R_1 \tag{1'}$$

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group.

An estimated mechanism of a reaction used in Production Process A is shown below. The description will hereinafter be made taking a case where a compound represented by the general formula (1') is used as a treatment agent, carbon black is used as the pigment, and potassium hexacyanoferrate(III) is used as an oxidizing agent as an example. Incidentally, an oxidizing species and a reducing species of potassium hexacyanoferrate(III) used as the oxidizing agent are described as $Fe^{3+}$ and $Fe^{2+}$, respectively.

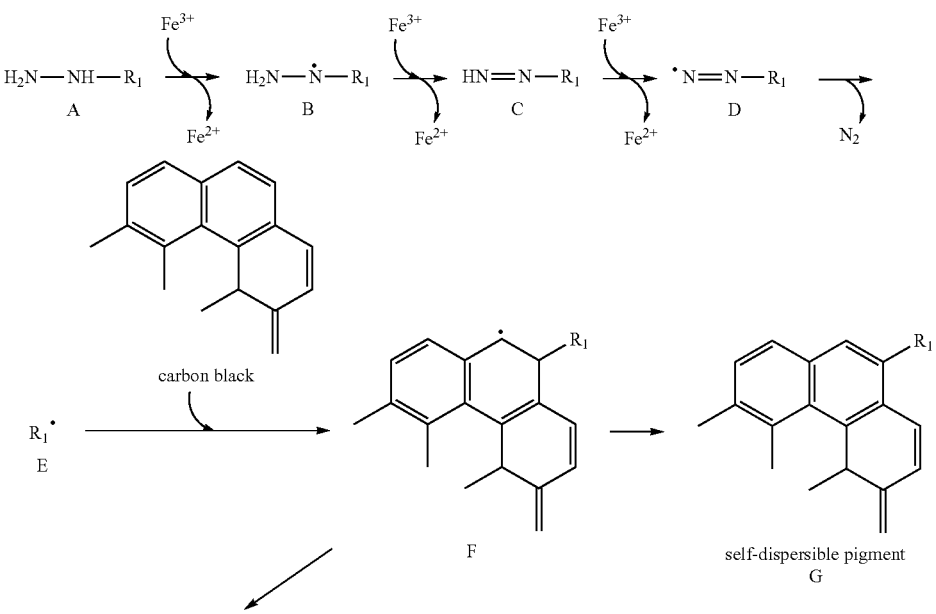

-continued

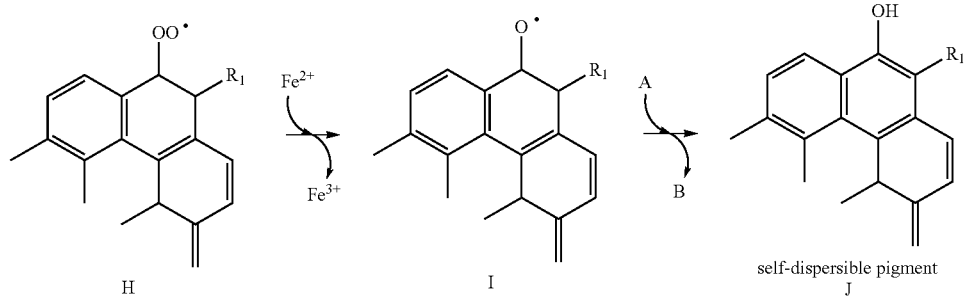

First, a hydrogen atom is removed from a compound A which is a hydrazine compound (compound represented by the general formula (1')) by the action of the oxidizing agent ($Fe^{3+}$), and thus the compound A is radically oxidized to form a hydrazyl radical B. A hydrogen atom is then removed from the hydrazyl radical B by the action of the oxidizing agent ($Fe^{3+}$) to form a compound C which is a diazene compound (compound represented by the general formula (1)). A hydrogen atom is further removed from the compound C by the action of the oxidizing agent ($Fe^{3+}$) to form a diazene radical D. The diazene radical D instantly gives rise to denitrification to form a radical species E. The radical species E then causes radical addition to an aromatic carbon atom on a particle surface of carbon black, whereby $R_1$ is bonded to the particle surface of carbon black through a radical intermediate F to obtain a self-dispersible pigment G.

When an oxidizing agent whose valence is liable to vary, such as potassium hexacyanoferrate(III), is used in Production Process A, another addition reaction than the above may occur in parallel in some cases. That is, at the same time when the radical species E causes radical addition to the aromatic carbon atom on the particle surface of carbon black to form the radical intermediate F, the radical is captured by an oxygen molecule, thereby forming a radical intermediate H. In this case, after the radical intermediate H is reduced by the action of a reducing species ($Fe^{2+}$) of the oxidizing agent, a self-dispersible pigment J which is in the form of an alcohol is obtained through an oxygen radical intermediate I.

Production Process B:

In Production Process B, a halogen atom is removed from a compound (halogenated aromatic compound) represented by the following general formula (2) by employing a compound (hydrazine compound) represented by the following general formula (3) to form a radical. Production Process B is a process for producing a self-dispersible pigment by bonding a functional group containing an anionic group to a particle surface of the pigment by radical addition reaction in which the radical formed participates, i.e., an oxidative radical addition reaction.

(2)

wherein $R_1$ is a halogen atom, $R_2$ is an aryl or heteroaryl group, $R_3$ is a hydrogen atom, a nitro, cyano or tosyl group, or a halogen atom, x is an integer of 1 or more, $R_4$ is at least one linking group selected from the group consisting of alkylene, carbonyl, ester and amide groups, y is 0 or 1, $R_5$ is at least one anionic group selected from the group consisting of a carboxylic acid group, a sulfonic acid group, a phosphoric acid group and a phosphonic acid group, z is an integer of 1 or more, and x+z is equal to the number of hydrogen atoms that $R_2$ can have.

$$(R_7)_n-N-N-(R_7)_n \qquad (3)$$

wherein each $R_7$ is independently a hydrogen atom or an alkyl group, and each n is independently 1 or 2.

An estimated mechanism of a reaction used in Production Process B is shown below. The description will hereinafter be made taking a case where hydrazine is used as the compound (halogen-removing compound) represented by the general formula (3), and "R—X" (in which a halogen atom is written as X, and another structure is written collectively as R) is used as the compound represented by the general formula (2) as an example. In addition, the description will be made taking a case where carbon black is used as the pigment, and potassium hexacyanoferrate(III) is used as an oxidizing agent as an example. An oxidizing species and a reducing species of potassium hexacyanoferrate(III) used as the oxidizing agent are described as $Fe^{3+}$ and $Fe^{2+}$, respectively.

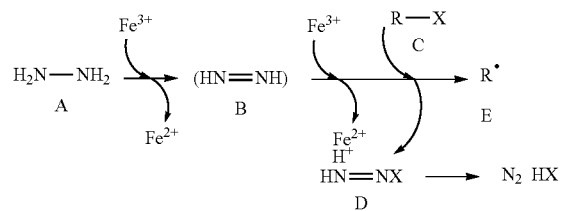

First, a hydrogen atom is removed from a compound A which is hydrazine by the action of the oxidizing agent ($Fe^{3+}$) to form an intermediate B. A halogen atom is then removed from a compound C which is a halogenated aromatic compound (compound represented by the general formula (2)) in the process that the intermediate B is further oxidized by the action of the oxidizing agent ($Fe^{3+}$) to form a radical species E. Since a by-product formed at this time is very unstable, it is immediately decomposed into hydrogen halide and nitrogen.

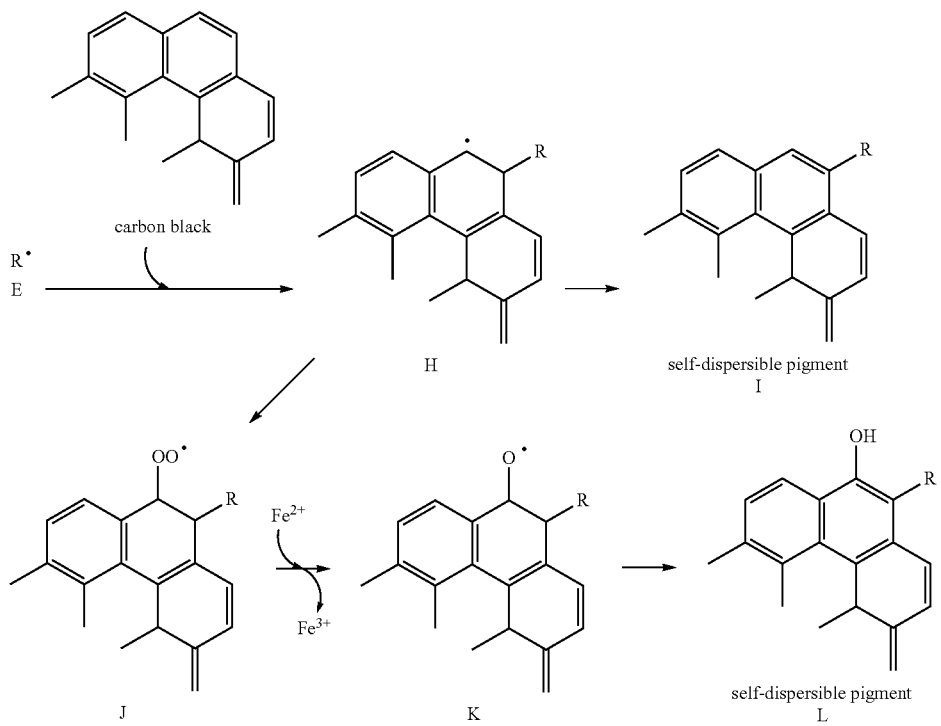

The radical species E then causes radical addition to an aromatic carbon atom on a particle surface of carbon black, whereby R is bonded to the particle surface of carbon black through a radical intermediate H to obtain a self-dispersible pigment I.

When an oxidizing agent whose valence is liable to vary, such as potassium hexacyanoferrate(III), is used in Production Process B, another addition reaction than the above may occur in parallel in some cases. That is, at the same time when the radical species E causes radical addition to the aromatic carbon atom on the particle surface of carbon black to form the radical intermediate H, the radical is captured by an oxygen molecule, thereby forming a radical intermediate J. In this case, after the radical intermediate J is reduced by the action of a reducing species ($Fe^{2+}$) of the oxidizing agent, and a self-dispersible pigment L which is in the form of an alcohol is obtained through an oxygen radical intermediate K.

Production Process C:

Production Process C is a process for producing a self-dispersible pigment by bonding a functional group to a particle surface of the pigment by radical addition reaction induced by removal of a hydrogen atom from a diazene compound formed by removal of a hydrogen atom from a treatment agent. This radical addition reaction is an oxidative radical addition reaction. At least one selected from a compound represented by the following general formula (4), a compound represented by the following general formula (5) and a compound represented by the following general formula (6) which are hydrazine compounds is used as the treatment agent.

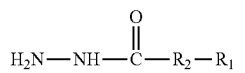

(4)

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group, and $R_2$ is an oxygen atom or NH.

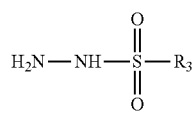

(5)

wherein $R_3$ is a group having at least one of an aliphatic group and an aromatic group and being substituted with at least one anionic group selected from the group consisting of a carboxylic acid group, a sulfonic acid group, a phosphoric acid group and a phosphonic acid group.

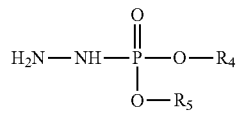

(6)

wherein $R_4$ and $R_5$ are, independently of each other, a group having at least one of an aliphatic group and an aromatic group and being substituted with at least one anionic group selected from the group consisting of a carboxylic acid group, a sulfonic acid group, a phosphoric acid group and a phosphonic acid group.

An estimated mechanism of a reaction used in Production Process C is shown below. Hereinafter, another portion than "$H_2N-NH-$" which is a common portion of the treatment agent is described as "R". In addition, the description will be made taking a case where carbon black is used as the pigment, and potassium hexacyanoferrate(III) is used as an oxidizing agent as an example. An oxidizing species and a reducing species of potassium hexacyanoferrate(III) used as the oxidizing agent are described as $Fe^{3+}$ and $Fe^{2+}$, respectively.

an oxygen molecule, thereby forming a radical intermediate H. In this case, after the radical intermediate H is reduced by the action of a reducing species ($Fe^{2+}$) of the oxidizing agent, a self-dispersible pigment J which is in the form of an alcohol is then obtained through an oxygen radical intermediate I.

Treatment Agents Used Production Processes A, B and C:

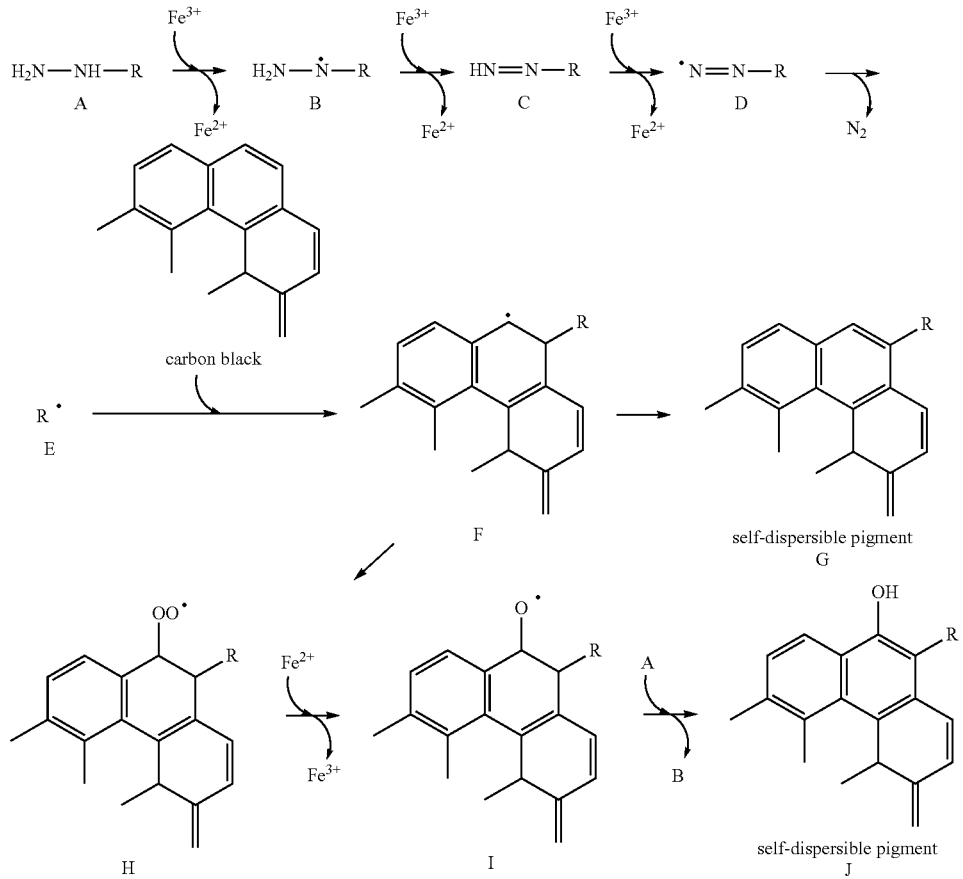

First, a hydrogen atom is removed from a compound A which is a hydrazine compound (compound represented by the general formula (5)) by the action of the oxidizing agent ($Fe^{3+}$), and thus the compound A is radically oxidized to form a hydrazyl radical B. A hydrogen atom is then removed from the hydrazyl radical B by the action of the oxidizing agent ($Fe^{3+}$) to form a compound C which is a diazene compound. A hydrogen atom is further removed from the compound C by the action of the oxidizing agent ($Fe^{3+}$) to form a diazene radical D. The diazene radical D instantly gives rise to denitrification to form a radical species E. The radical species E causes radical addition to an aromatic carbon atom on a particle surface of carbon black, whereby R is bonded to the particle surface of carbon black through a radical intermediate F to obtain a self-dispersible pigment G.

When an oxidizing agent whose valence is liable to vary, such as potassium hexacyanoferrate(III), is used in Production Process C, another addition reaction than the above may occur in parallel in some cases. That is, at the same time when the radical species E causes radical addition to the aromatic carbon atom on the particle surface of carbon black to form the radical intermediate F, the radical is captured by In Production Process A, the compound represented by the general formula (1) is used as the treatment agent for the pigment. The compound represented by the general formula (1) is a diazene compound on which an anionic group has been substituted. The compound represented by the general formula (1) can be obtained by, for example, removal of a hydrogen atom from the compound represented by the general formula (1'). That is, a group $R_1$ can be bonded to a particle surface of a pigment through the compound represented by the general formula (1) by sequential removal of a hydrogen atom from the compound represented by the general formula (1'). Therefore, in Production Process A, the compound represented by the general formula (1') is also included in the treatment agent used for the treatment of the pigment. The compound represented by the general formula (1') is a compound having a hydrazino group (—NH—$NH_2$) and an anionic group, and acid addition salts such as hydrazine sulfate and hydrazine hydrochloride, and hydrates thereof are also included therein.

$R_1$ in the general formulae (1) and (1') is as follows. That is, $R_1$ is a group having at least one of an aliphatic group and an aromatic group and being substituted with at least one anionic group selected from the group consisting of a carboxylic acid group, a sulfonic acid group, a phosphoric acid group and a phosphonic acid group.

In Production Process B, the compound represented by the general formula (2) is used as the treatment agent for the pigment. The compound represented by the general formula (2) is a halogenated aromatic compound on which an anionic group has been substituted. The halogen atom represented by $R_1$ of the compound represented by the general formula (2) is removed by a compound represented by the general formula (3) which is the above-described halogen-removing agent. The functional group (atomic group other than $R_1$ in the general formula (2)) containing the anionic group can thereby be bonded to the particle surface of the pigment.

(2)

wherein $R_1$ is a halogen atom, $R_2$ is an aryl or heteroaryl group, $R_3$ is a hydrogen atom, a nitro, cyano or tosyl group, or a halogen atom, x is an integer of 1 or more, $R_4$ is at least one linking group selected from the group consisting of alkylene, carbonyl, ester and amide groups, y is 0 or 1, $R_5$ is at least one anionic group selected from the group consisting of a carboxylic acid group, a sulfonic acid group, a phosphoric acid group and a phosphonic acid group, z is an integer of 1 or more, and x+z is equal to the number of hydrogen atoms that $R_2$ can have.

In Production Process C, at least one selected from a compound represented by the general formula (4), a compound represented by the general formula (5) and a compound represented by the general formula (6) is used as the treatment agent for the pigment. All the compounds represented by the general formulae (4) to (6) are hydrazine compounds having an anionic group. This hydrazine compound is converted to a diazene compound by removal of a hydrogen atom. That is, a diazene structure (—N═NH) is formed by removing a hydrogen atom from a hydrazino group (—NH—NH$_2$). In this manner, the treatment agent (hydrazine compound) modifies a pigment into a self-dispersible pigment by bonding the functional group (corresponding to other structure than the hydrazino group of the treatment agent) containing the anionic group to the particle surface of the pigment by further removal of a hydrogen atom through the diazene compound. That is, although the diazene compound actually modifies the pigment into the self-dispersible pigment, the pigment is modified into the self-dispersible pigment by sequential removal of a hydrogen atom from the hydrazine compound. Therefore, the hydrazine compound is also included in the treatment agent used for the treatment of the pigment in Production Process C. In addition, acid addition salts of hydrazine, such as hydrazine sulfate and hydrazine hydrochloride, and hydrates thereof are also included in the treatment agent.

(4)

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group, and $R_2$ is an oxygen atom or NH.

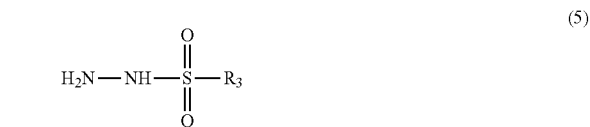

(5)

wherein $R_3$ is a group having at least one of an aliphatic group and an aromatic group and being substituted with at least one anionic group selected from the group consisting of a carboxylic acid group, a sulfonic acid group, a phosphoric acid group and a phosphonic acid group.

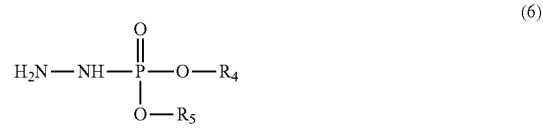

(6)

wherein $R_4$ and $R_5$ are, independently of each other, a group having at least one of an aliphatic group and an aromatic group and being substituted with at least one anionic group selected from the group consisting of a carboxylic acid group, a sulfonic acid group, a phosphoric acid group and a phosphonic acid group.

As examples of the aliphatic group in the general formulae (1), (1'), (4), (5) and (6), there may be mentioned an alkyl group, an alkenyl group and an alkynyl group. The alkyl, alkenyl and alkynyl groups may be any of linear, branched and cyclic chains. The number of carbon atoms in the linear and branched alkyl, alkenyl and alkynyl groups is favorably of about 1 to 12. In addition, the cyclic alkyl, alkenyl and alkynyl groups may be any of a single ring and a complex (fused) ring. The number of elements constituting a ring is favorably about 3 to 8. As examples of the aliphatic group, there may be mentioned linear saturated alkyl groups such as methyl, ethyl, propyl, butyl, pentyl and hexyl groups; branched saturated alkyl groups such as isopropyl, isobutyl and 2-ethylhexyl groups; alkenyl groups such as ethenyl, propenyl and butenyl groups; alkynyl groups such as ethynyl, propynyl and butynyl groups; and alicyclic groups such as cyclopropyl, cyclobutyl, cyclopentyl and cyclohexyl groups. The aliphatic group may have such a substituent as a halogen atom such as a fluorine atom, a chlorine atom and a bromine atom, and a hydroxy group.

As examples of the aromatic group in the general formulae (1), (1'), (4), (5) and (6), there may be mentioned an aryl group and a heteroaryl group. The aryl and heteroaryl groups may be any of a single ring and a complex (fused) ring. The number of elements constituting a ring is favorably about 3 to 8. As examples of the aryl group, there may be mentioned a phenyl group, a naphthyl group, an anthracenyl group, a phenanthrenyl group and a biphenyl group. As examples of the heteroaryl group, there may be mentioned a pyridyl group, an imidazolyl group, a pyrazolyl group, a pyridinyl group, a thienyl group and a thiazolyl group. Among these, phenyl, naphthyl, anthracenyl, phenanthrenyl, biphenyl and pyridinyl groups are favorable, and phenyl and naphthyl groups are more favorable.

As examples of the group having an aliphatic group and an aromatic group in the general formulae (1), (1'), (4), (5) and (6), there may be mentioned groups in which the above-mentioned groups are directly or through a general linker structure such as —O—, —NH—, —CO—, —COO—, —CONH—, —N═N—, —SO— and —SO$_2$—. In order to improve the hydrophilicity of the functional group, it is more favorable to let the group having the aliphatic group and the aromatic group have the linker structure.

As examples of the halogen atom in the general formula (2), may be mentioned fluorine, chlorine, bromine and iodine atoms. Among these, a fluorine or chlorine atom is favorable.

The aryl or heteroaryl group in the general formula (2) may be any of a single ring and a complex (fused) ring. The number of elements constituting a ring is favorably about 3 to 8. As examples of the aryl group, there may be mentioned a phenyl group, a naphthyl group, an anthracenyl group, a phenanthrenyl group and a biphenyl group. As examples of the heteroaryl group, there may be mentioned a pyridyl group, an imidazolyl group, a pyrazolyl group, a pyridinyl group, a thienyl group and a thiazolyl group. Among these, phenyl, naphthyl, anthracenyl, phenanthrenyl, biphenyl and pyridinyl groups are favorable, and phenyl and naphthyl groups are more favorable.

$R_4$ in the general formula (2) is at least one linking group selected from the group consisting of alkylene, carbonyl, ester and amide groups, and y is 0 or 1. The fact that y is 0 means that $R_2$ is bonded directly to $R_5$. $R_4$ has a structure linking $R_2$ (aryl or heteroaryl group) to $R_5$ (an anionic group). A moiety represented by —$R_2$—$(R_4)_y$— becomes a linking group between the particle surface of the pigment and the anionic group ($R_5$).

The anionic group in the general formulae (1) to (6) is at least one selected from the group consisting of a carboxylic acid group, a sulfonic acid group, a phosphoric acid group and a phosphonic acid group. These anionic groups may also be in the form of a salt or an anhydride so far as it is chemically permitted.

When the carboxylic acid, sulfonic acid, phosphoric acid or phosphonic acid group forms a salt, at least one proton of such a group is substituted by a cation. As examples of the cation, there may be mentioned an alkali metal ion, an ammonium ion and an organic ammonium ion. As examples of the alkali metal ion, there may be mentioned lithium, sodium and potassium ions. As examples of the organic ammonium ion, there may be mentioned cations of aliphatic amines such as mono- to tri-alkylamines and aliphatic alcoholamines such as mono- to tri-alkanolamines, and salts thereof. A salt may be present in a state of being dissociated into an ion in an aqueous liquid. However, such a salt is represented as "salt" for convenience' sake.

The substitution number of anionic groups in the compounds represented by the general formulae (1), (2), (4), (5) and (6) is theoretically equal to the number of hydrogen atoms existing in the group having at least one of the aliphatic group and the aromatic group. For example, the substitution number of anionic groups is 1 to 3 for a methyl group, 1 to 5 for an ethyl group, 1 to 5 for a phenyl group, 1 to 7 for a naphthyl group, 1 to 9 for an anthracenyl group and 1 to 4 for a pyridyl group. When one or two anionic groups are actually substituted per one of the group having at least one of the aliphatic group and the aromatic group though the number may vary according to the structure, the pigment can be modified into the self-dispersible pigment.

z in the general formula (3) is an integer of 1 or more, and x+z is equal to the number of hydrogen atoms that $R_2$ can have. That is, x+z is equal to the maximum number of hydrogen atoms that $R_2$ can theoretically have. For example, X+Z is 1 to 4 when $R_2$ is a phenyl group, 1 to 6 when $R_2$ is a naphthyl group, 1 to 8 when $R_2$ is an anthracenyl group, and 1 to 3 when $R_2$ is a pyridyl group. When x+z is 1 or 2 though the number may vary according to the structure, the pigment can be modified into the self-dispersible pigment.

In Production Process B, the compound represented by the general formula (3) is used as the halogen-removing agent for removing a halogen from the compound represented by the general formula (2) which is used for the treatment of the pigment. The compound represented by the general formula (3) is hydrazine or a derivative thereof and may be in the form of a hydrate, or an acid addition salt such as sulfate, phosphate, hydrochloride or hydrobromide.

$$(R_7)_n\text{—N—N—}(R_7)_n \qquad (3)$$

wherein each $R_7$ is independently a hydrogen atom or an alkyl group, and each n is independently 1 or 2.

When each of $R_7$ is hydrogen atoms, the compound represented by the general formula (3) is hydrazine. In addition, when at least one of the groups $R_7$ is an alkyl group, the compound represented by the general formula (3) is alkyl-substituted hydrazine. The alkyl group may be any of linear and branched chains. The number of carbon atoms in the alkyl group is favorably of the order of 1 or more and 6 or less, more favorably of the order of 1 or more and 3 or less. As examples of the alkyl group, may be mentioned linear alkyl groups such as methyl, ethyl, propyl, butyl, pentyl and hexyl groups; and branched alkyl groups such as isopropyl, isobutyl and 2-ethylhexyl groups. Above all, hydrazine compounds substituted by an alkyl group can suitably be used because most of them are available on the market, and they are also easily available. Further, mono-alkyl-substituted hydrazine or dialkyl-substituted hydrazine is favorably used, and methylhydrazine or dimethylhydrazine is more favorably used.

Oxidizing Agent Used in Production Processes A, B and C:

In Production Processes A, B and C, the self-dispersible pigment can also be produced in the presence of an oxidizing agent. The oxidizing agent is used for improving the reaction rate. However, the reaction utilized in the Production Processes A, B and C can also progress without using the oxidizing agent.

When the oxidizing agent reacts with the pigment, a carbon atom on the particle surface of the pigment is generally oxidized to form a carboxylic acid group. On the other hand, the oxidizing agent acts on the treatment agent and the hydrazine compound in Production Processes A, B and C, and an oxidative radical addition reaction is promoted subsequently to this. Accordingly, the oxidizing agent does not act directly on the particle surface of the pigment. The reason for this is that energy necessary for acting on the treatment agent and the hydrazine compound is lower than energy (bond energy between carbon and oxygen) necessary for oxidizing a carbon atom on the particle surface of the pigment to derive a carbonyl species (C═O). That is, when the treatment agent and the hydrazine compound are present, the oxidizing agent is considered to be consumed for the action on the treatment agent and the hydrazine compound.

As examples of the oxidizing agent usable in Production Processes A, B and C, there may be mentioned halogens, oxoacid compounds, metal oxides, metal halide compounds, metal porphyrin compounds, hexacyanometalate compounds, metal nitrates, hydrogen peroxide and nitric acid.

As examples of the halogens, there may be mentioned chlorine, bromine and iodine. As examples of the oxoacid compounds, there may be mentioned chromic acid, molybdic acid, permanganic acid, vanadic acid, bithmutic acid, hypohalous acid, halous acid, halogen acid and perhalogen acid. These oxoacid compounds may form a salt, but require to have a metal. As examples of a cation forming the salt, there may be mentioned an alkali metal ion and an ammonium ion. The salt may be present in a state of being dissociated into an ion in an aqueous liquid. However, such a salt is represented as "salt" for convenience's sake. As specific examples of the oxoacid compounds, there may be mentioned chromates such as potassium chromate, potassium dichromate, bis(tetrabutylammonium)bichromate, pyridinium bichromate, pyridinium chlorochromate and pyridinium fluorochromate; permanganates such as potassium permanganate, sodium permanganate, ammonium permanganate, silver permanganate, zinc permanganate and magnesium permanganate; vanadates such as ammonium vanadate, potassium vanadate and sodium vanadate; bismuthates such as sodium bismuthate and potassium bismuthate; and hypochlorous acid, chlorous acid, perchloric acid, hypobromous acid, bromous acid, bromic acid, perbromic acid, hypoiodous acid, iodous acid, iodic acid, periodic acid and hypofluorous acid and salts thereof.

As examples of the metal oxides, there may be mentioned manganese oxide, lead oxide, copper oxide, silver oxide and osmium oxide. As examples of the metal halide compounds, there may be mentioned zinc chloride, aluminum chloride, silver chloride, chromium chloride, zirconium chloride, tin chloride, cerium chloride, iron chloride, barium chloride, magnesium chloride and manganese chloride.

As examples of the metal porphyrin compounds, there may be mentioned porphyrin compounds which have a central metal and may be substituted. As specific examples thereof, there may be mentioned tetrabenzoporphyrin compounds, tetraazaporphyrin compounds, phthalocyanine compounds and naphthlocyanine compounds. As examples of the central metal, there may be mentioned Fe, Co, Ni, Cu, Zn, Mg, Pt, Mn, Ru, Cr and Pd. A ligand may be present in the metal, and a publicly known ligand may be used as the ligand.

As examples of the hexacyanometalate compounds, there may be mentioned hexacyanoferrates and hydrates thereof. As specific examples thereof, there may be mentioned potassium hexacyanoferrate, sodium hexacyanoferrate, ammonium hexacyanoferrate, copper hexacyanoferrate, hexacyanoferrate complexes (for example, lithium potassium hexacyanoferrate) and hydrates thereof.

As examples of the metal nitrates, there may be mentioned potassium nitrate, sodium nitrate, silver nitrate and copper nitrate.

For example, organic peroxides, hypervalent iodine compounds and N-oxide compounds may also be used in addition to the oxidizing agents mentioned above.

n addition, an oxidizing agent having a catalytic action may also be used. Among the oxidizing agents mentioned above, the metal halide compounds, metal porphyrin compounds or hexacyanometalate compounds of at least one metal selected from the group consisting of Fe, Co, Ni, Cu, Mg, Mn, Cr and Mo have the catalytic action. The oxidizing agent having the catalytic action can be used again as an oxidizing agent because the oxidizing agent used in the removal of the hydrogen atom becomes a reducing species, and then the reducing species returns to an oxidizing species by the action of oxygen in the reaction system. Accordingly, when the oxidizing agent having the catalytic action is used, the amount of the oxidizing agent used can be reduced. The oxidizing agent having the catalytic action has a metal whose valence is easy to vary (a metal element which can have two or more oxidation states). Specific examples of valence changes of the metal include Fe (II and III), Co (II and III), Ni (II and III), Cu (0, I and II), Mg (0 and II), Mn (II, IV and VII), Cr (II and III) and Mo (IV and V). A mechanism of causing the catalytic action will be described by a specific example. For example, in case of an oxidizing agent having trivalent Fe (Fe(III)), $Fe^{3+}$ (Fe(III)) which is an oxidizing species, is used in the removal of the hydrogen atom from the hydrazine compound to form $Fe^{2+}$ (Fe(II)), which is a reducing species. Thereafter, the reducing species returns to $Fe^{3+}$ (Fe(III)), which is an oxidizing species, by the action of oxygen in the reaction system, whereby the oxidizing species can be used again as the oxidizing agent.

Reaction Conditions of Production Processes A, B and C:

Production Processes A, B and C are generally conducted in an aqueous liquid medium. As for the aqueous liquid medium, water alone or an aqueous medium which contains water as a main solvent and uses a protonic or aprotic organic solvent in combination may be used. The aqueous medium is a mixed solvent of water and an organic solvent. A solvent which is miscible with or dissolved in water even in any proportion is favorably used as the organic solvent. In particular, a uniformly mixed solvent containing 50% by mass or more of water is favorably used as the aqueous medium. Ion-exchanged water or pure water is favorably used as the water.

The protonic organic solvent is an organic solvent having a hydrogen atom bonded to oxygen or nitrogen (an acidic hydrogen atom). The aprotic organic solvent is an organic solvent having no acidic hydrogen atom. As examples of the organic solvent, there may be mentioned alcohols, alkylene glycols, polyalkylene glycols, glycol ethers, glycol ether esters, carboxylic acid amides, ketones, keto-alcohols, cyclic ethers, nitrogen-containing compounds and sulfur-containing compounds.

As examples of the liquid medium suitably usable in Production Processes A, B and C, there may be mentioned water, water/methanol mixed solvents, water/ethanol mixed solvents, water/ethylene glycol mixed solvents, water/N-methylpyrrolidone mixed solvents, water/tetrahydrofuran mixed solvent and water/acetone mixed solvents.

Since the treatment agent and the hydrazine compound used in Production Processes A, B and C are chemically stable and hardly influenced by pH and temperature, the pH or temperature of the reaction system may be arbitrarily set. Specifically, the pH of the reaction system is favorably 1 or more and 13 or less, more favorably 1 or more and 10 or less. Above all, the pH of the reaction system is more favorably 1.5 or more and 7 or less, particularly favorably 2 or more and 7 or less.

In order to control a reaction rate of the radical addition reaction, the temperature may also be set to another temperature than ordinary temperature (25° C.). The temperature may be suitably set according to the kinds of the treatment agent and the hydrazine compound. Specifically, the temperature is favorably 5° C. or more and 80° C. or less, more favorably 10° C. or more and 70° C. or less, particularly favorably 10° C. or more and 40° C. or less. When the temperature is made high, the reaction rate can be raised. However, side reactions are easy to occur. When the temperature is made low on the other hand, the side reactions are hard to occur. However, the reaction rate is lowered, so that the reaction time may become long in some cases.

Production Processes A, B and C are generally conducted in a liquid medium. The content (% by mass) of the pigment in the liquid medium is 1.0% by mass or more and 50.0% by mass or less, more favorably 5.0% by mass or more and 40.0% by mass or less based on the total mass of the liquid medium. If the content of the pigment is too high, the viscosity of the reaction system becomes high, which is particularly remarkable in the case where the pigment is carbon black, and so agitation of the reaction system becomes hard in some cases. When the content of the pigment is too low on the other hand, contact frequency between the treatment agent and the hydrazine compound, and the pigment in the reaction system is lowered in some cases, and turbulent flow is caused by the agitation because the viscosity of the reaction system is too low, and thus agitation efficiency may be liable to decrease in some cases.

Salt Formed by Bonding of Cation and Anion:

A specified salt may be contained in the ink according to the present invention for more improving the uniformity of the resulting image. The content (% by mass) of the salt in the ink is favorably 0.05% by mass or more and 2.00% by mass or less based on the total mass of the ink though it may vary according to the molecular weight of the salt. If the content of the salt is less than 0.05% by mass, an effect to more improve the uniformity of the image may not be sufficiently achieved in some cases, which is particularly marked in case where a recording medium having high permeability is used. If the content of the salt is more than 2.00% by mass on the other hand, the storage stability of the resulting ink may be somewhat lowered in some cases.

The salt which may be contained in the ink according to the present invention is formed by bonding a cation and an anion. The cation is at least one selected from the group consisting of an alkali metal ion, an ammonium ion and an organic ammonium ion. The anion is at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$. The form of the salt in the ink may be any of a state that a part thereof has been dissociated and a state that the whole thereof has been dissociated.

The cation making up the salt is a monovalent cation and at least one selected from the group consisting of an alkali metal ion, an ammonium ion and an organic ammonium ion. As examples of the alkali metal ion, may be mentioned lithium, sodium and potassium ions. As examples of the organic ammonium ion, may be mentioned cations of alkylamines whose number of carbon atoms is 1 or more and 3 or less, such as methylamine and ethylamine; and alkanolamines whose number of carbon atoms is 1 or more and 4 or less, such as monoethanolamine, diethanolamine and triethanolamine.

As examples of the salt formed by bonding the cation and the anion, there may be mentioned the following salts when a monovalent cation is represented by ($M_2$). ($M_2$)Cl, ($M_2$)Br, ($M_2$)I, ($M_2$)ClO, ($M_2$)ClO$_2$, ($M_2$)ClO$_3$, ($M_2$)ClO$_4$, ($M_2$)NO$_2$, ($M_2$)NO$_3$, ($M_2$)$_2$SO$_4$, ($M_2$)$_2$CO$_3$, ($M_2$)HCO$_3$, HCOO($M_2$), COO($M_2$)$_2$, COOH(COO($M_2$)), CH$_3$COO($M_2$), C$_2$H$_4$(COO($M_2$))$_2$, C$_6$H$_5$COO($M_2$), C$_6$H$_4$(COO($M_2$))$_2$, ($M_2$)$_3$PO$_4$, ($M_2$)$_2$HPO$_4$ and ($M_2$)H$_2$PO$_4$.

A carboxylic acid salt or a sulfuric acid salt is favorable as the salt from the viewpoint of solubility in an aqueous medium. Among others, a salt of a divalent anion, such as C$_6$H$_4$(COO($M_2$))$_2$ or ($M_2$)$_2$SO$_4$ is more favorable. In addition, a potassium ion or an ammonium ion is favorable as the cation. C$_6$H$_4$(COOK)$_2$, C$_6$H$_4$(COONH$_4$)$_2$, K$_2$SO$_4$ or (NH$_4$)$_2$SO$_4$ is favorable as the salt, and C$_6$H$_4$(COONH$_4$)$_2$ is particularly favorable. In addition, it is favorable that the kinds of a counter ion (cation) of the anionic group of the self-dispersible pigment and the cation of the salt are made the same.

The improvement of the uniformity of the image by the salt is considered to be attributable to the fact that an electric double layer of the self-dispersible pigment becomes easier to be compressed upon evaporation of a liquid component by increase of an electrolyte concentration in the ink, and so the aggregation of the pigment is accelerated. Accordingly, it may be said from the viewpoint of the improvement of the uniformity of the image that the electrolyte concentration in the ink, i.e., a molar amount of the salt is more dominant over the kinds of the ions making up the salt.

Resin:

A resin may be contained in the ink according to the present invention. The resin may be added into the ink for purposes of (i) more stabilizing a dispersed state of the self-dispersible pigment and (ii) improving the scratch resistance or the like of an image recorded. The content (% by mass) of the resin in the ink is favorably 0.10% by mass or more and 5.00% by mass or less based on the total mass of the ink.

The resin favorably has an anionic group. As specific examples of the resin, may be mentioned acrylic resins, polyester resins, urethane resins, urea resins, polysaccharides and polypeptides. Among these, acrylic resins and urethane resins are favorable because the ejection stability of the resulting ink is more easily secured. In addition, as examples of the form of the resin, may be mentioned a block copolymer, a random copolymer, a graft copolymer and combinations thereof.

A state of the resin in the ink may be either a state dissolved in an aqueous medium or a state dispersed as resin particles in the aqueous medium. In the present invention, the fact that a resin is water-soluble means that the resin does not form any particle whose particle size can be measured by a dynamic light scattering system when the resin is neutralized with an alkali equivalent to the acid value of the resin. The acid value of the resin is favorably 30 mg KOH/g or more and 350 mg KOH/g or less.

Aqueous Medium:

In the ink according to the present invention, water or an aqueous medium which is a mixed solvent of water and a water-soluble organic solvent may be used. In the present invention, an aqueous ink containing at least water as an aqueous medium is favorably provided. Deionized water (ion-exchanged water) is favorably used as the water. The content (% by mass) of water in the ink is favorably 10.0% by mass or more and 90.0% by mass or less, more favorably 50.0% by mass or more and 90.0% by mass or less based on the total mass of the ink.

No particular limitation is imposed on the water-soluble organic solvent so long as it is soluble in water, and then an alcohol, a polyhydric alcohol, a polyglycol, a nitrogen-containing polar solvent or a sulfur-containing polar solvent may be used. Among these, a water-soluble organic solvent having a lower vapor pressure at 25° C. than water is favorably used. The content (% by mass) of the water-soluble organic solvent in the ink is favorably 5.0% by mass or more and 90.0% by mass or less, more favorably 10.0% by mass or more and 50.0% by mass or less based on the total mass of the ink.

Other Additives:

The ink according to the present invention may also contain a water-soluble organic compound which is solid at ordinary temperature, such as a polyhydric alcohol such as trimethylolpropane and trimethylolethane, urea, a urea derivative such as ethyleneurea and hydantoin, or a sugar, as needed, in addition to the above-described components. In addition, the ink according to the present invention may also contain various additives such as a surfactant, a pH adjustor, a rust preventive, a preservative, a mildewproofing agent, an antioxidant, an antireductant, an evaporation accelerating agent, a chelating agent and a water-soluble resin, as needed.

Examples of the surfactant include anionic, cationic and nonionic surfactants. The content (% by mass) of the surfactant in the ink is favorably 0.1% by mass or more and 5.0% by mass or less, more favorably 0.1% by mass or more and 2.0% by mass or less based on the total mass of the ink.

A nonionic surfactant such as a polyoxyethylene alkyl ether, a polyoxyethylene fatty acid ester, a polyoxyethylene alkyl phenyl ether, a polyoxyethylene-polyoxypropylene block copolymer or an acetylene glycol-based compound is favorably used as the surfactant. The hydrophobic group of the surfactant is easy to adsorb on the particle surface of the self-dispersible pigment. Thus, the dispersed state of the self-dispersible pigment in the ink can be more stably retained. The reason for this is as follows. Among the surfactants, the nonionic surfactant has no ionic group, so that its interaction with the functional group of the self-dispersible pigment is hard to occur, but it is easy to adsorb on the particle surface of the self-dispersible pigment.

Physical Properties of Ink:

In the case where the ink according to the present invention is applied to an ink jet system, it is favorable to suitably control the physical property values thereof. Specifically, the surface tension of the ink at 25° C. is favorably 10 mN/m or more and 60 mN/m or less, more favorably 20 mN/m or more and 60 mN/m or less. In particular, the surface tension is favorably 30 mN/m or more and 50 mN/m or less, more favorably 30 mN/m or more and 40 mN/m or less. The viscosity of the ink at 25° C. is favorably 1.0 mP·s or more and 10.0 mP·s or less, more favorably 1.0 mP·s or more and 5.0 mP·s or less, particularly favorably 1.0 mP·s or more and 3.0 mP·s or less. The pH of the ink at 25° C. is favorably 5 or more and 9 or less.

Ink Cartridge:

The ink cartridge according to the present invention is provided with an ink and an ink storage portion storing this ink. The ink stored in this ink storage portion is the above-described ink according to the present invention. FIG. 1 is a sectional view schematically illustrating an ink cartridge according to an embodiment of the present invention. As illustrated in FIG. 1, an ink supply port 12 for supplying the ink to a recording head is provided in a bottom surface of the ink cartridge. The interior of the ink cartridge is the ink storage portion for storing the ink. The ink storage portion is constituted by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber storing the liquid ink. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method:

The ink jet recording method according to the present invention is a method of ejecting the above-described ink according to the present invention from a recording head of an ink jet system to record an image on a recording medium. As systems for ejecting the ink, a system in which mechanical energy is applied to the ink and a system in which thermal energy is applied to the ink are mentioned. In the present invention, the system in which the thermal energy is applied to the ink to eject the ink is particularly favorably adopted. Steps of the ink jet recording method may be those publicly known except that the ink according to the present invention is used.

Figure 2A:
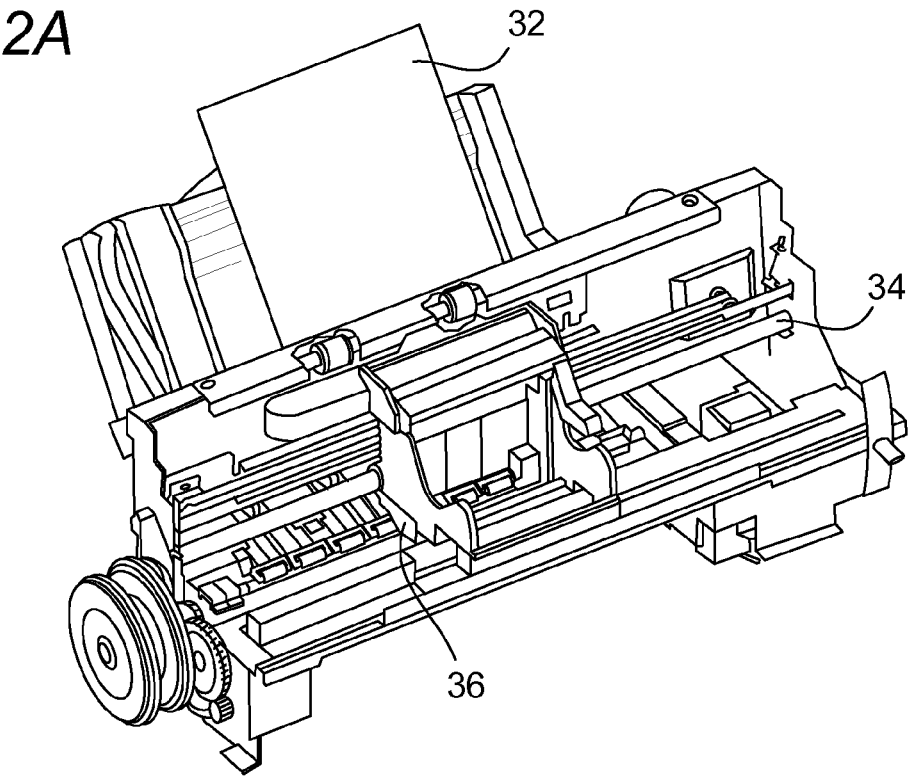
Figure 2B:
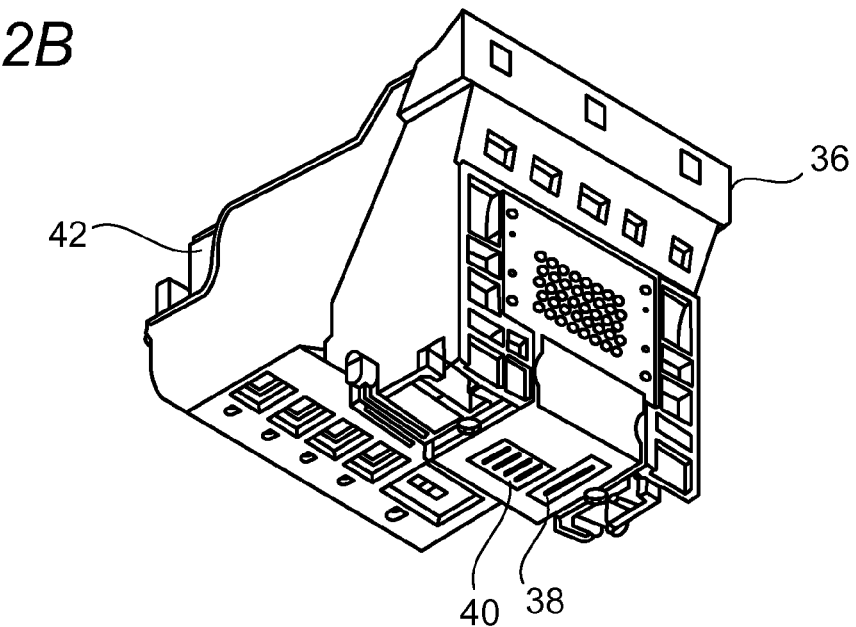

FIGS. 2A and 2B schematically illustrate an example of an ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be mounted on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a primary scanning direction along the carriage shaft 34. The recording medium 32 is then conveyed in a secondary scanning direction by the conveyance unit (not illustrated), whereby an image is recorded on the recording medium 32.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components are based on mass unless expressly noted.

Analytical Conditions:

An aqueous dispersion liquid of a self-dispersible pigment produced was diluted with pure water to reduce the content of the self-dispersible pigment to 3.0% by mass or less, thereby obtaining a liquid. Six grams of the resultant liquid was put into a polycarbonate-made tube having capacity of 10 ml. Centrifugation was then conducted for 15 hours at 80,000 rpm by an ultracentrifugal separator (trade name "Optima™ Max-XP Ultra Centrifuge", manufactured by BECKMAN COULTER) to collect a precipitate. The resultant precipitate was diluted with pure water, and its pH was adjusted with a 0.1 mol/l aqueous solution of potassium hydroxide or a 0.1 mol/l aqueous solution of hydrochloric acid, as needed, so as to give a pH of 8.0±0.2, thereby preparing an aqueous dispersion liquid in which the content of the self-dispersible pigment was 0.01%. The aqueous dispersion liquid thus prepared was used as a sample to analyze the self-dispersible pigment.

Introduced Amount of Functional Group:

The introduced amount (mmol/g) of the functional group of the self-dispersible pigment was calculated out from a colloid titration value measured under the following conditions which was converted to a value (average value) per 1 g of the self-dispersible pigment.

Apparatus: A potentiometric titration device (trade name "AT-510", manufactured by KYOTO ELECTRONICS MANUFACTURING CO., LTD.),
Sample: That prepared above,
Titrant: A 5 mmol/l aqueous solution of methyl glycol chitosan,
Dropping amount: 0.05 ml,
Judgement of end point: An inflection point in potentiometric titration conducted by using an automatic control software (AT-win), and
Temperature: 25° C.

Zeta Potential and Standard Deviation of Zeta Potential:

The zeta potential (mV) of the self-dispersible pigment was calculated out as an average value of zeta potentials measured about 100,000 or more self-dispersible pigment particles under the following conditions. In addition, "the positive square root of the variance" was determined from the zeta potentials of the 100,000 or more particles to regard this value as "a standard deviation of the zeta potential".
Apparatus: A zeta potential measuring device (trade name "Zetasizer Nano Z" (manufactured by Malvern Instruments),
Sample: That prepared above,
Cell: Clear disposable zeta cell, and
Temperature: 25° C.

Particle Size:

The average particle sizes (a 50% cumulative value [$D_{50}$ (nm)] in the volume-based particle size distribution) and $D_{90}$ (a 90% cumulative value (nm) in the volume-based particle size distribution) of the self-dispersible pigment were measured under the following conditions.
Apparatus: A particle size distribution meter (trade name "NANOTRAC UPA150EX; manufactured by NIKKISO) using a dynamic light scattering system,
SetZero: 180 seconds,
Number of measurements: 3 times,
Measuring time: 120 seconds,
Refractive index: 1.8 (carbon black), 1.5 (other pigments).

Production of Self-Dispersible Pigment:

In the following description as to a production process, "mmol/g" means the number of millimoles (mmol) per 1.0 g of a pigment.

Self-Dispersible Pigment 1:

A plastic container having capacity of 2 liters was charged with 100.0 g of a pigment, 800.0 g of ion-exchanged water and 0.50 mmol/g of a treatment agent, and the resultant mixture was agitated for 10 minutes. Carbon black (trade name "TOKA BLACK #8300", product of Tokai Carbon Co., Ltd.) was used as the pigment. 4-Hydrazinophathalic acid hydrochloride (product of Chem Genesis Inc.) was used as the treatment agent. The pH of the resultant liquid was adjusted to 8 by adding an 8 mol/l aqueous solution of potassium hydroxide. Thereafter, the liquid was agitated for 12 hours at a temperature of 25° C., the number of rotor revolutions of 15,000 rpm and the number of screen revolutions of 13,000 rpm by means of a disperser to obtain a dispersion liquid. As the disperser, was used trade name "CLEARMIX W-Motion" (motor: rotor 2.2 W and screen 3.7 W, manufactured by M Technique Co., Ltd.). Impurities were removed from the resultant dispersion liquid by means of an ultrafilter membrane (trade name "OS300C11", molecular weight cutoff: 300 K, product of Pall Corporation) to purify the dispersion liquid. The purification was conducted by repeating the following operations (i) and (ii) until the electrical conductivity of a filtrate reached 50 μS/cm or lower.

(i) A liquid obtained by adding 3,200 g of ion-exchanged water to 800 g of the dispersion liquid to dilute the dispersion liquid is concentrated to 800 g by means of the ultrafilter membrane (taking out 3,200 g of the filtrate);

(ii) The dispersion liquid is diluted by adding 3,200 g of ion-exchanged water, and the diluted liquid is concentrated again by means of the ultrafilter membrane.

After the purified dispersion liquid was centrifuged for 15 minutes at the number of revolutions of 5,000 rpm by means of by means of a centrifugal separator (trade name "CR-21G", manufactured by Hitachi Koki Co., Ltd.) to remove coarse particles, ion-exchanged water was added, thereby obtaining an aqueous dispersion liquid of Self-Dispersible Pigment 1, in which the content of Self-Dispersible Pigment 1 was 10.0%.

Self-Dispersible Pigment 2:

An aqueous dispersion liquid of Self-Dispersible Pigment 2 was obtained in the same manner as in the production of Self-Dispersible Pigment 1 with the exception that 0.10 mmol/g of potassium ferrocyanide was used as the oxidizing agent.

Self-Dispersible Pigment 3:

An aqueous dispersion liquid of Self-Dispersible Pigment 3 was obtained in the same manner as in the production of Self-Dispersible Pigment 1 with the exception that 0.10 mmol/g of potassium periodate was used as the oxidizing agent.

Self-Dispersible Pigment 4:

An aqueous dispersion liquid of Self-Dispersible Pigment 4 was obtained in the same manner as in the production of Self-Dispersible Pigment 1 with the exception that 0.10 mmol/g of Iron(III) chloride was used as the oxidizing agent.

Self-Dispersible Pigment 5:

An aqueous dispersion liquid of Self-Dispersible Pigment 5 was obtained in the same manner as in the production of Self-Dispersible Pigment 1 with the exception that an 8 mol/l aqueous solution of potassium hydroxide was used to adjust the pH upon the reaction to 8.

Self-Dispersible Pigment 6:

An aqueous dispersion liquid of Self-Dispersible Pigment 6 was obtained in the same manner as in the production of Self-Dispersible Pigment 1 with the exception that 28% aqueous ammonia was used to adjust the pH upon the reaction to 8.

Self-Dispersible Pigment 7:

An aqueous dispersion liquid of Self-Dispersible Pigment 7 was obtained in the same manner as in the production of Self-Dispersible Pigment 1 with the exception that the amount of the treatment agent used was changed to 0.15 mmol/g.

Self-Dispersible Pigment 8:

An aqueous dispersion liquid of Self-Dispersible Pigment 8 was obtained in the same manner as in the production of Self-Dispersible Pigment 1 with the exception that the amount of the treatment agent used was changed to 0.17 mmol/g.

Self-Dispersible Pigment 9:

An aqueous dispersion liquid of Self-Dispersible Pigment 9 was obtained in the same manner as in the production of Self-Dispersible Pigment 1 with the exception that the amount of the treatment agent used was changed to 1.00 mmol/g.

Self-Dispersible Pigment 10:

An aqueous dispersion liquid of Self-Dispersible Pigment 10 was obtained in the same manner as in the production of Self-Dispersible Pigment 1 with the exception that the amount of the treatment agent used was changed to 1.50 mmol/g.

Self-Dispersible Pigment 11:

An aqueous dispersion liquid of Self-Dispersible Pigment 11 was obtained in the same manner as in the production of Self-Dispersible Pigment 1 with the exception that the temperature upon the reaction was changed to 80° C.

Self-Dispersible Pigment 12:

An aqueous dispersion liquid of Self-Dispersible Pigment 12 was obtained in the same manner as in the production of Self-Dispersible Pigment 1 with the exception that the temperature upon the reaction was changed to 85° C.

Self-Dispersible Pigment 13:

An aqueous dispersion liquid of Self-Dispersible Pigment 13 was obtained in the same manner as in the production of Self-Dispersible Pigment 1 with the exception that the temperature upon the reaction was changed to 5° C.

Self-Dispersible Pigment 14:

An aqueous dispersion liquid of Self-Dispersible Pigment 14 was obtained in the same manner as in the production of Self-Dispersible Pigment 1 with the exception that the 8 mol/l aqueous solution of potassium hydroxide was not used. The pH upon the reaction was 2 due to an absence of the 8 mol/l aqueous solution of potassium hydroxide.

Self-Dispersible Pigment 15:

An aqueous dispersion liquid of Self-Dispersible Pigment 15 was obtained in the same manner as in the production of Self-Dispersible Pigment 1 with the exception that an 8 mol/l aqueous solution of potassium hydroxide was used to adjust the pH upon the reaction to 11.

Self-Dispersible Pigment 16:

A plastic container having capacity of 2 liters was charged with 100.0 g of a pigment, 800.0 g of ion-exchanged water and 0.125 mmol/g of a treatment agent, and the resultant mixture was agitated for 10 minutes. Carbon black (trade name "TOKA BLACK #8300", product of Tokai Carbon Co., Ltd.) was used as the pigment. 4-Hydrazinophathalic acid hydrochloride was used as the treatment agent. The pH of the resultant liquid was adjusted to 8 by adding an 8 mol/l aqueous solution of potassium hydroxide. Thereafter, the liquid was agitated for 3 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). An operation that 0.125 mmol/g per time of the treatment agent is added, and the agitation is then conducted for 3 hours was made 3 times in total to obtain a dispersion liquid. Accordingly, the total amount of the treatment agent used was 0.50 mmol/g, and the total agitation time was 12 hours. Other conditions than these were made the same as in the production of Self-Dispersible Pigment 1 to obtain an aqueous dispersion liquid of Self-Dispersible Pigment 16.

Self-Dispersible Pigment 17:

An aqueous dispersion liquid of Self-Dispersible Pigment 17 was obtained in the same manner as in the production of Self-Dispersible Pigment 1 with the exception that the treatment agent was changed to 1.00 mmol/g of 4-hydrazinobenzoic acid (product of TOKYO CHEMICAL INDUSTRY CO., LTD.).

Self-Dispersible Pigment 18:

An aqueous dispersion liquid of Self-Dispersible Pigment 18 was obtained in the same manner as in the production of Self-Dispersible Pigment 1 with the exception that the treatment agent was changed to 1.00 mmol/g of 4-hydrazinobenzenesulfonic acid (product of TOKYO CHEMICAL INDUSTRY CO., LTD.).

Self-Dispersible Pigment 19:

An aqueous dispersion liquid of Self-Dispersible Pigment 19 was obtained in the same manner as in the production of Self-Dispersible Pigment 1 with the exception that the treatment agent was changed to 1.00 mmol/g of P-(4-hydrazinylphenyl)phosphonic acid (product of Aurora Fine Chemical).

Self-Dispersible Pigment 20:

An aqueous dispersion liquid of Self-Dispersible Pigment 20 was obtained in the same manner as in the production of Self-Dispersible Pigment 1 with the exception that the treatment agent was changed to 0.50 mmol/g of P,P'-[[(4-aminobenzoyl)amino]methylene]bisphosphonic acid hydrochloride (product of Sumika Technoservice Corporation)

Self-Dispersible Pigment 21:

An aqueous dispersion liquid of Self-Dispersible Pigment 21 was obtained in the same manner as in the production of Self-Dispersible Pigment 1 with the exception that the pigment was changed to carbon black (trade name "NIPEX 170IQ", product of Orion Engineered Carbons).

Self-Dispersible Pigment 22:

An aqueous dispersion liquid of Self-Dispersible Pigment 22 was obtained in the same manner as in the production of Self-Dispersible Pigment 1 with the exception that the pigment was changed to carbon black (trade name "#2600", product of Mitsubishi Chemical Corporation).

Self-Dispersible Pigment 23:

An aqueous dispersion liquid of Self-Dispersible Pigment 23 was obtained in the same manner as in the production of Self-Dispersible Pigment 1 with the exception that the pigment was changed to carbon black (trade name "MCF88", product of Mitsubishi Chemical Corporation).

Self-Dispersible Pigment 24:

An aqueous dispersion liquid of Self-Dispersible Pigment 24 was obtained in the same manner as in the production of Self-Dispersible Pigment 1 with the exception that the pigment was changed to carbon black (trade name "Color Black FW200", product of Orion Engineered Carbons).

Self-Dispersible Pigment 25:

The agitation time by the disperser was changed to 1 hour, and a dispersion treatment of 5 passes under a pressure of 200 MPa was then made by means of a high-pressure homogenizer (trade name "Nanomizer L-ES", manufactured by Yoshida Kikai Co., Ltd.) to obtain a dispersion liquid. Other conditions than these were made the same as in the production of Self-Dispersible Pigment 1 to obtain an aqueous dispersion liquid of Self-Dispersible Pigment 25.

Self-Dispersible Pigment 26:

The agitation time by the disperser was changed to 1 hour, and a dispersion treatment of 5 passes at the number of revolutions of 2,500 rpm under conditions that a packing rate of zirconia beads having a diameter of 0.3 mm is 70% was then made by means of a bead mill to obtain a dispersion liquid. As the bead mill, was used trade name "NANO GETTER DMS65" (manufactured by Ashizawa Finetech Ltd.). Other conditions than these were made the same as in the production of Self-Dispersible Pigment 1 to obtain an aqueous dispersion liquid of Self-Dispersible Pigment 26.

Self-Dispersible Pigment 27:

The agitation time by the disperser was changed to 1 hour, and a dispersion treatment corresponding to 5 passes at a circumferential speed of 50 m/sec and the number of revolutions of 2,500 rpm was then made by means of a thin-film spin system high-speed mixer (trade name "FILMIX FM80-50", manufactured by PRIMIX corporation) to obtain a dispersion liquid. Other conditions than these were made the same as in the production of Self-Dispersible Pigment 1 to obtain an aqueous dispersion liquid of Self-Dispersible Pigment 27.

Self-Dispersible Pigment 28:

Dispersion was conducted for 12 hours by a circulating system at the number of revolutions of a scrape mixer of 2,000 rpm by means of a disperser (trade name "Pro-shear Mixer", manufactured by Pacific Machining & Engineering Co., Ltd.) without conducting the agitation by the disperser (trade name "CLEARMIX W-Motion") to obtain a dispersion liquid. Other conditions than these were made the same as in the production of Self-Dispersible Pigment 1 to obtain an aqueous dispersion liquid of Self-Dispersible Pigment 28.

Self-Dispersible Pigment 29:

A plastic container having capacity of 2 liters was charged with 100.0 g of a pigment, 800.0 g of ion-exchanged water and 0.25 mmol/g of a treatment agent, and the resultant mixture was agitated for 10 minutes. Carbon black (trade name "TOKA BLACK #8300", product of Tokai Carbon Co., Ltd.) was used as the pigment. 4-Hydrazinophathalic acid hydrochloride was used as the treatment agent. The pH of the resultant liquid was adjusted to 8 by adding an 8 mol/l aqueous solution of potassium hydroxide. Thereafter, the liquid was agitated for 6 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). After 0.50 mmol/g of a treatment agent (4-hydrazinobenzoic acid) was further added, the pH of the liquid was adjusted to 8 by adding an 8 mol/l aqueous solution of potassium hydroxide. The agitation was further made for 6 hours under the same conditions as described above to obtain a dispersion liquid. Other conditions than these were made the same as in the production of Self-Dispersible Pigment 1 to obtain an aqueous dispersion liquid of Self-Dispersible Pigment 29.

Self-Dispersible Pigment 30:

A plastic container having capacity of 2 liters was charged with 100.0 g of a pigment, 800.0 g of ion-exchanged water and 0.25 mmol/g of a treatment agent, and the resultant mixture was agitated for 10 minutes. Carbon black (trade name "TOKA BLACK #8300", product of Tokai Carbon Co., Ltd.) was used as the pigment. 4-Hydrazinophathalic acid hydrochloride was used as the treatment agent. The pH of the resultant liquid was adjusted to 8 by adding an 8 mol/l aqueous solution of potassium hydroxide. Thereafter, the liquid was agitated for 6 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). After 0.25 mmol/g of a treatment agent (P,P'-[[(4-aminobenzoyl)amino]methylene]bisphosphonic acid hydrochloride) was further added, the pH of the liquid was adjusted to 8 by adding an 8 mol/l aqueous solution of potassium hydroxide. The agitation was further made for 6 hours under the same conditions as described above to obtain a dispersion liquid. Other conditions than these were made the same as in the production of Self-Dispersible Pigment 1 to obtain an aqueous dispersion liquid of Self-Dispersible Pigment 30.

Self-Dispersible Pigment 31:

A plastic container having capacity of 2 liters was charged with 100.0 g of a pigment, 800.0 g of ion-exchanged water, 0.125 mmol/g of a treatment agent and 0.06 mmol/g of a diazotizing agent (potassium nitrite), and the resultant mixture was agitated for 10 minutes. Carbon black (trade name "TOKA BLACK #8300", product of Tokai Carbon Co., Ltd.) was used as the pigment. 4-Aminophthalic acid (product of TOKYO CHEMICAL INDUSTRY CO., LTD.) was used as the treatment agent. The pH of the resultant liquid was adjusted to 8 by adding an 8 mol/l aqueous solution of potassium hydroxide. Thereafter, the liquid was agitated for 3 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). An operation that 0.125 mmol/g per time of the treatment agent and 0.06 mmol/g per time of the diazotizing agent are added, and the agitation is then conducted for 1 hour was made 3 times in total to obtain a dispersion liquid. Accordingly, the total amounts of the treatment agent and diazotizing agent used were 0.50 mmol/g and 0.24 mmol/g, respectively, and the total agitation time was 12 hours. Other conditions than these were made the same as in the production of Self-Dispersible Pigment 1 to obtain an aqueous dispersion liquid of Self-Dispersible Pigment 31.

Self-Dispersible Pigment 32:

After 130.0 g of a pigment and 664.0 g of chlorosulfonic acid were mixed, a chlorosulfonating reaction was conducted for 20 hours at a temperature of 120° C. to obtain a reaction mixture. Carbon black (trade name "TOKA BLACK #8300", product of Tokai Carbon Co., Ltd.) was used as the pigment. After the resultant reaction mixture was cooled to a temperature of 50° C., 137.0 g of thionyl chloride was added dropwise. Thereafter, the temperature of the resultant reaction mixture was raised to 100° C., and this temperature was retained for 4 hours. After the reaction mixture was cooled to 25° C. once, water and ice were added to stop the reaction by keeping the temperature at less than −5° C. by cooling. A precipitate formed by this operation was separated by filtration and washed with cold water of 5° C. or less to obtain a wet cake. A plastic container having capacity of 2 liters was charged with 200.0 g (including 100.0 g of the pigment) of the resultant wet cake, 700.0 g of ion-exchanged water and 0.125 mmol/g of a treatment agent, and the resultant mixture was agitated for 10 minutes. Thereafter, the mixture was agitated for 3 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). An operation that 0.125 mmol/g per time of the treatment agent is added, and the agitation is then conducted for 3 hours was made 3 times in total to obtain a dispersion liquid. Accordingly, the total amount of the treatment agent used was 0.50 mmol/g, and the total agitation time was 12 hours. Other conditions than these were made the same as in the production of Self-Dispersible Pigment 1 to obtain an aqueous dispersion liquid of Self-Dispersible Pigment 32.

Self-Dispersible Pigment 33:

A mixed liquid of 18.0 g of a pigment, 150 ml of ethanol and 50 ml of ion-exchanged water, 1.00 mmol/g of a treatment agent, and 2.00 mmol/g of a halogen-removing agent were placed in a 500-ml flask equipped with a reflux condenser and mixed. Carbon black (trade name "TOKA BLACK #8300", product of Tokai Carbon Co., Ltd.) was used as the pigment, 4-fluorobenzenesulfonic acid (product of AAT Pharmaceutical) was used as the treatment agent, and hydrazine monohydrate (product of TOKYO CHEMICAL INDUSTRY CO., LTD.) was used as the halogen-removing agent. The pH of the resultant liquid was adjusted to 9 by adding an 8 mol/l aqueous solution of sodium hydroxide. Thereafter, the liquid was agitated for 8 hours at a temperature of 25° C., the number of rotor revolutions of 15,000 rpm and the number of screen revolutions of 13,000 rpm by means of a disperser to obtain a dispersion liquid. As the disperser, was used trade name "CLEARMIX W-Motion" (motor: rotor 2.2 W and screen 3.7 W, manufactured by M Technique Co., Ltd.). Other conditions than these were made the same as in the production of Self-Dispersible Pigment 1 to obtain an aqueous dispersion liquid of Self-Dispersible Pigment 33.

Self-Dispersible Pigment 34:

18.0 grams of a pigment, 180 ml of ion-exchanged water and 1.00 mmol/g of a treatment agent were placed in a vessel (manufactured by IMEX Co., Ltd.) having capacity of 400 ml and mixed. Carbon black (trade name "TOKA BLACK #8300", product of Tokai Carbon Co., Ltd.) was used as the pigment. $H_2N-NH-COO-C_6H_4-COOH$ (product of Sumika Technoservice Corporation) was used as the treatment agent. The pH of the resultant liquid was adjusted to 3 by adding 1 mol/l hydrochloric acid. Thereafter, the liquid was agitated for 4 hours at a temperature of 25° C., the number of rotor revolutions of 15,000 rpm and the number of screen revolutions of 13,000 rpm by means of a disperser and then agitated for 4 hours at 80° C. to obtain a reaction mixture. As the disperser, was used trade name "CLEARMIX W-Motion" (motor: rotor 2.2 W and screen 3.7 W, manufactured by M Technique Co., Ltd.). After the temperature of the reaction mixture was then cooled to 25° C., the pH of the liquid was adjusted to 10 by adding an 8 mmol/l aqueous solution of sodium hydroxide to obtain an aqueous dispersion liquid. Other conditions than these were made the same as in the production of Self-Dispersible Pigment 1 to obtain an aqueous dispersion liquid of Self-Dispersible Pigment 34.

Self-Dispersible Pigment 35:

An aqueous dispersion liquid of Self-Dispersible Pigment 35 was obtained in the same manner as in the production of Self-Dispersible Pigment 1 with the exception that the pigment was changed to C.I. Pigment Blue 15:3 (trade name "Tonar Cyan BG", product of Clariant).

Self-Dispersible Pigment 36:

An aqueous dispersion liquid of Self-Dispersible Pigment 36 was obtained in the same manner as in the production of Self-Dispersible Pigment 1 with the exception that the pigment was changed to C.I. Pigment Red 122 (trade name "Hostaperm Pink E02", product of Clariant).

Self-Dispersible Pigment 37:

An aqueous dispersion liquid of Self-Dispersible Pigment 37 was obtained in the same manner as in the production of Self-Dispersible Pigment 1 with the exception that the pigment was changed to C.I. Pigment Yellow 74 (trade name "Hansa Brilliant Yellow 5GX", product of Clariant).

Self-Dispersible Pigment 38:

An aqueous dispersion liquid of Self-Dispersible Pigment 38 was obtained in the same manner as in the production of Self-Dispersible Pigment 1 with the exception that the pigment was changed to C.I. Pigment Green 7 (trade name "Hostaperm Green GNX", product of Clariant).

Self-Dispersible Pigment 39:

An aqueous dispersion liquid of Self-Dispersible Pigment 39 was obtained in the same manner as in the production of Self-Dispersible Pigment 1 with the exception that the pigment was changed to finely particulate titanium oxide (trade name "MT-500HD", product of TAYCA Corporation)

Self-Dispersible Pigment 40:

An aqueous dispersion liquid of Self-Dispersible Pigment 40 was obtained according to the following procedure conforming to Example 6 of Japanese Patent Application Laid-Open No. 2000-512329. A mixture of 981.7 ml of ion-exchanged water and 57.4 g of a treatment agent (4-aminophthalic acid) was cooled by an ice bath. After 162.5 ml of concentrated hydrochloric acid was added, 50 ml of acetone was added to dissolve 4-aminophthalic acid. A solution with 44.9 g of sodium nitrite dissolved in 100 ml of ion-exchanged water was further added. The mixture was changed to a dark color by the addition of sodium nitrite, and a small amount of a gas was generated. The resultant mixture (Mixture A) contained 0.039 g per gram of the diazonium salt of 4-aminophthalic acid. Into 1,800 g of ion-exchanged water cooled by an ice bath, was added 200.0 g of a pigment (carbon black) having a BET specific surface area of 350 $m^2/g$ and a DBP oil absorption of 120 ml/100 g. Under agitation, 131.0 g of the above-obtained Mixture A was added. As a result, a gas was generated. The agitation was continued until the generation of the gas stopped, thereby obtaining a slurry. After the resultant slurry was filtered under vacuum, the resultant residue was washed with ion-exchanged water to obtain a wet cake. The resultant wet cake was dried in an oven controlled to a temperature of 75° C. to obtain a pigment dried to solids. 90.0 grams of the resultant pigment and 800.0 g of ion-exchanged water were mixed, and the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 40. The amount of the treatment agent used was 0.14 mmol/g.

Self-Dispersible Pigment 41:

An aqueous dispersion liquid of Self-Dispersible Pigment 41 was obtained in the same manner as in the production of Self-Dispersible Pigment 40 with the exception that the amount of ion-exchanged water was changed to 1,669 g from 1,800 g, and the amount of Mixture A used was changed to 263.0 g. The amount of the treatment agent used was 0.29 mmol/g.

Self-Dispersible Pigment 42:

An aqueous dispersion liquid of Self-Dispersible Pigment 42 was obtained in the same manner as in the production of Self-Dispersible Pigment 40 with the exception that the amount of ion-exchanged water was changed to 1,537 g from 1,800 g, and the amount of Mixture A used was changed to 394.0 g. The amount of the treatment agent used was 0.43 mmol/g.

Self-Dispersible Pigment 43:

An aqueous dispersion liquid of Self-Dispersible Pigment 43 was obtained in the same manner as in the production of Self-Dispersible Pigment 40 with the exception that the amount of ion-exchanged water was changed to 1,275 g from 1,800 g, and the amount of Mixture A used was changed to 656.0 g. The amount of the treatment agent used was 0.57 mmol/g.

Self-Dispersible Pigment 44:

An aqueous dispersion liquid of Self-Dispersible Pigment 44 was obtained according to the following procedure conforming to Example 6 of Japanese Patent Application Laid-Open No. 2000-512329. A mixture of 981.7 ml of ion-exchanged water and 57.4 g of a treatment agent (4-aminophthalic acid) was cooled by an ice bath. After 162.5 ml of concentrated hydrochloric acid was added, 50 ml of acetone was added to dissolve 4-aminophthalic acid. A solution with 55.4 g of potassium nitrite dissolved in 100 ml of ion-exchanged water was further added. The mixture was changed to a dark color by the addition of potassium nitrite, and a small amount of a gas was generated. This mixture (Mixture B) contained 0.039 g per gram of the diazonium salt of 4-aminophthalic acid. Into 670 g of ion-exchanged water cooled by an ice bath, was added 100.0 g of a pigment (carbon black, trade name "TOKA BLACK #8300", product of Tokai Carbon Co., Ltd.). thereafter, 590.0 g of Mixture B was added, and all of them were placed in a plastic container having capacity of 2 liters and agitated for 10 minutes. Thereafter, agitation was made for 4 hours at a temperature of 25° C., the number of rotor revolutions of 15,000 rpm and the number of screen revolutions of 13,000 rpm by means of a disperser to obtain a slurry. As the disperser, was used trade name "CLEARMIX W-Motion" (motor: rotor 2.2 W and screen 3.7 W, manufactured by M Technique Co., Ltd.). It was confirmed that the generation of the gas is stopped after the agitation for 4 hours. After the resultant slurry was filtered under vacuum, the resultant residue was washed with ion-exchanged water to obtain a wet cake. The resultant wet cake was dried in an oven controlled to a temperature of 75° C. to obtain a pigment dried to solids. 90.0 grams of the resultant pigment and 800.0 g of ion-exchanged water were mixed, and the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 44. The amount of the treatment agent used was 0.65 mmol/g.

Self-Dispersible Pigment 45:

An aqueous dispersion liquid of Self-Dispersible Pigment 45 was obtained according to the following procedure conforming to Example 3 of Japanese Patent Application Laid-Open No. 2003-096350. The temperature of a mixture of 10.0 g of 6 mol/g hydrochloric acid and 1.5 g of a treatment agent (2-aminobenzoid acid, product of Kishida Chemical Co., Ltd.) was retained to 5° C. by an ice bath, 1.8 g of sodium nitrite was added thereto, and agitation was made. Five grams of a pigment (carbon black, trade name "TOKA BLACK #8300", product of Tokai Carbon Co., Ltd.) was added, and the temperature of the resultant liquid was raised to 80° C. under agitation, and the agitation was continued until the generation of a gas stopped, thereby obtaining a slurry. After the resultant slurry was cooled, a proper amount of acetone was added, and a pigment was taken out by filtration and washed. 90.0 grams of the resultant pigment and 800.0 g of ion-exchanged water were mixed, and the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 45. The amount of the treatment agent used was 2.19 mmol/g.

Self-Dispersible Pigment 46:

An aqueous dispersion liquid of Self-Dispersible Pigment 46 was obtained according to the following procedure conforming to Example 4 of Japanese Patent Application Laid-Open No. 2003-096350. An aqueous dispersion liquid of Self-Dispersible Pigment 46 was obtained in the same manner as in the production of Self-Dispersible Pigment 45 with the exception that the treatment agent was changed to 4-aminobenzenesulfonic acid (product of TOKYO CHEMICAL INDUSTRY CO., LTD.). The amount of the treatment agent used was 1.73 mmol/g.

Self-Dispersible Pigment 47:

An aqueous dispersion liquid of Self-Dispersible Pigment 47 was obtained according to the following procedure conforming to Example 31 of Japanese Patent Application Laid-Open No. 2012-528917. 18.0 grams of a pigment, 200 ml of ion-exchanged water and 1.00 mmol/g of 4-hydrazinobenzoic acid were mixed, and the pH of the resultant mixture was adjusted to 9 with ammonium hydroxide to obtain a liquid mixture. Carbon black (trade name "Black Pearls 700", product of Cabot) was used as the pigment. The resultant liquid mixture was placed in a Pyrex (trademark) dish, and the dish was put into an oven and heated for 24 hours at a temperature of 120° C. to dry the pigment to solids. 90.0 grams of the dried pigment and 800.0 g of ion-exchanged water were mixed, and the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 47.

Self-Dispersible Pigment 48:

An aqueous dispersion liquid of Self-Dispersible Pigment 48 was obtained according to the following procedure conforming to the description in Japanese Patent Application Laid-Open No. 2003-535949. Specifically, a pigment (carbon black, trade name "Color Black FW18", product of Orion Engineered Carbons) was subjected to the oxidation treatment by ozone and the post treatment in reference to the description of Example 1 in Japanese Patent Application Laid-Open No. 2003-535949, and the pH of the resultant liquid was adjusted to 6.5 to 7.5 to obtain a dispersion liquid. Other conditions than these were made the same as in the production of Self-Dispersible Pigment 1 to obtain an aqueous dispersion liquid of Self-Dispersible Pigment 48.

Self-Dispersible Pigment 49:

An aqueous dispersion liquid of Self-Dispersible Pigment 49 was obtained according to the following procedure in reference to the description in Japanese Patent Application Laid-Open No. 2000-345095. A plastic container having capacity of 2 liters was charged with 100.0 g of a pigment (carbon black, trade name "TOKA BLACK #8300", product of Tokai Carbon Co., Ltd.) and 800.0 g of ion-exchanged water, and the resultant mixture was agitated for 10 minutes. Thereafter, 500.0 g of sodium hypochlorite (effective chlorine concentration: 12%) was added dropwise while being agitated for 8 hours at a temperature of 25° C., the number of rotor revolutions of 15,000 rpm and the number of screen revolutions of 13,000 rpm by means of a disperser. As the disperser, was used trade name "CLEARMIX W-Motion" (motor: rotor 2.2 W and screen 3.7 W, manufactured by M Technique Co., Ltd.). Thereafter, the pigment was taken out by filtration. After 90.0 g of the resultant pigment and 800.0 g of ion-exchanged water were mixed, the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 49.

Self-Dispersible Pigment 50:

An aqueous dispersion liquid of Self-Dispersible Pigment 50 was obtained according to the following procedure in reference to the description in Japanese Patent Application Laid-Open No. 2004-168898. A mixed gas having a nitric acid gas concentration of 4.0% by volume was prepared by vaporizing 98% concentrated nitric acid in air. The mixed gas prepared was heated to a temperature of 150° C. and caused to flow in a reaction tube controlled to a gas temperature of 150° C. at a flow rate of 10 m/sec. A pigment (carbon black, trade name "TOKA BLACK #8300", product of Tokai Carbon Co., Ltd.) was fed into this gas stream at a proportion of 10 g/min in such a manner that the amount of nitric acid is 45.5 parts to 100.0 parts of the pigment, and dispersed by an ejector. After the pigment was oxidized in such a manner that the retention time of the pigment in the reaction tube is 60 seconds, the gas stream accompanied by the pigment was cooled to a temperature of 50° C. to collect the pigment. The step up to this point was conducted by means of an accompanying gas stream type oxidation reaction apparatus illustrated in FIG. 1 of Japanese Patent Application Laid-Open No. 2004-168898. The overall length from a nitric acid vaporizing device to a pigment (carbon black) feeding/dispersing device was set to 3 μm (retention time: about 0.5 seconds). As the ejector portion for dispersing the pigment, was used that having a nozzle diameter of 2 mm, and an ejection rate was set to about 300 m/s. With respect to piping in reaction apparatus 1 to 3, a stainless steel-made pipe having an inner diameter of 25 mm and an overall length of 100 μm was arranged in a reaction vessel in a state bent into a spiral form having a diameter of 1.8 to 2 mm. The overall length of a pipe in a cooling portion was 10 m. 90.0 grams of the pigment collected and 800.0 g of ion-exchanged water were mixed, and the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 50.

Self-Dispersible Pigment 51:

A plastic container having capacity of 2 liters was charged with 100.0 g of a pigment (carbon black, trade name "TOKA BLACK #8300", product of Tokai Carbon Co., Ltd.) and 800.0 g of ion-exchanged water, and the resultant mixture was agitated for 10 minutes. Thereafter, 1,000 g of a 3 mol/l aqueous solution of sodium peroxodisulfate was added dropwise while being agitated for 8 hours at a temperature of 25° C., the number of rotor revolutions of 15,000 rpm and the number of screen revolutions of 13,000 rpm by means of a disperser. As the disperser, was used trade name "CLEAR-MIX W-Motion" (motor: rotor 2.2 W and screen 3.7 W, manufactured by M Technique Co., Ltd.). Thereafter, the pigment was taken out by filtration. After 90.0 g of the resultant pigment and 800.0 g of ion-exchanged water were mixed, the pH of the resultant liquid was adjusted to 8 with an 8 mol/l aqueous solution of potassium hydroxide to obtain a dispersion liquid. Other conditions than these were made the same as in the production of Self-Dispersible Pigment 1 to obtain an aqueous dispersion liquid of Self-Dispersible Pigment 51.

Self-Dispersible Pigment 52:

An aqueous dispersion liquid of Self-Dispersible Pigment 52 was obtained according to the following procedure in reference to the description in Japanese Patent Application Laid-Open No. 2010-275478. Specifically, a pigment (carbon black, trade name "Printex 80", product of Orion Engineered Carbons) was subjected to the oxidation treatment by sodium hypochlorite and the treatment by an azo compound [4,4'-azobis(4-cyanopentanoic acid)] in reference to the description of Example 1 in Japanese Patent Application Laid-Open No. 2010-275478, and purification was made by Soxhlet extraction with acetone to obtain a dispersion liquid. Other conditions than these were made the same as in the production of Self-Dispersible Pigment 1 to obtain an aqueous dispersion liquid of Self-Dispersible Pigment 52.

Self-Dispersible Pigment 53:

An aqueous dispersion liquid of Self-Dispersible Pigment 53 was obtained according to the following procedure in reference to the description in Japanese Patent Application Laid-Open No. 2012-117020. Specifically, a pigment (carbon black, trade name "Printex 80", product of Orion Engineered Carbons) was subjected to the oxidation treatment by aqueous ozone using a prescribed apparatus in reference to the description of Example 1, and the resultant dispersion liquid was discharged out of the apparatus. Other conditions than these were made the same as in the production of Self-Dispersible Pigment 1 to obtain an aqueous dispersion liquid of Self-Dispersible Pigment 53.

Self-Dispersible Pigment 54:

A proper amount of ion-exchanged water was added into a self-dispersible pigment (trade name "Cab-O-Jet 300", product of Cabot) to obtain an aqueous dispersion liquid of Self-Dispersible Pigment 54, in which the content of Self-Dispersible Pigment 54 was 10.0%.

Production Conditions and Properties of Self-Dispersible Pigment:

Production conditions of self-dispersible pigments are shown in Table 1. Meanings (kinds of pigments) of abbreviations in Table 1 are as follows.

CB1: TOKA BLACK #8300 (product of Tokai Carbon Co., Ltd.)

CB2: NIPEX 170IQ (product of Orion Engineered Carbons)

CB3: #2600 (product of Mitsubishi Chemical Corporation)

CB4: MCF88 (product of Mitsubishi Chemical Corporation)

CB5: Color Black FW200 (product of Orion Engineered Carbons)

CB6: Carbon black having a BET specific surface area of 350 m$^2$/g and a DBP oil absorption of 120 ml/100 g CB7: Black Pearls 700 (product of Cabot)

CB8: Color Black FW18 (product of Orion Engineered Carbons)

PC1: Toner Cyan BG (product of Clariant)

CB9: Printex 80 (product of Orion Engineered Carbons)

QA: Hostaperm Pink EB transp. (product of Clariant)

AZ: Hansa Brilliant Yellow 5GX (product of Clariant)

PC2: Hostaperm Green GNX (product of Clariant)

T1: Finely particulate titanium oxide (trade name "MT-500HC", product of TAYCA Corporation).

TABLE 1

Production conditions of self-dispersible pigment

| No. of self-dispersible pigment | Kind of pigment | Treatment agent Kind | Amount used (mmol/g) | Others | pH | Temp (° C.) | Reaction time |
|---|---|---|---|---|---|---|---|
| 1 | CB1 | 4-Hydrazinophthalic acid hydrochloride | 0.50 | — | 8 | 25 | 12 hr |
| 2 | CB1 | 4-Hydrazinophthalic acid hydrochloride | 0.50 | $K_4[Fe(CN)_6] \cdot 3H_2O$ | 8 | 25 | 12 hr |
| 3 | CB1 | 4-Hydrazinophthalic acid hydrochloride | 0.50 | $IKO_4$ | 8 | 25 | 12 hr |
| 4 | CB1 | 4-Hydrazinophthalic acid hydrochloride | 0.50 | $FeCl_3$ | 8 | 25 | 12 hr |
| 5 | CB1 | 4-Hydrazinophthalic acid hydrochloride | 0.50 | — | 8 | 25 | 12 hr |
| 6 | CB1 | 4-Hydrazinophthalic acid hydrochloride | 0.50 | — | 8 | 25 | 12 hr |
| 7 | CB1 | 4-Hydrazinophthalic acid hydrochloride | 0.15 | — | 8 | 25 | 12 hr |
| 8 | CB1 | 4-Hydrazinophthalic acid hydrochloride | 0.17 | — | 8 | 25 | 12 hr |
| 9 | CB1 | 4-Hydrazinophthalic acid hydrochloride | 1.00 | — | 8 | 25 | 12 hr |
| 10 | CB1 | 4-Hydrazinophthalic acid hydrochloride | 1.50 | — | 8 | 25 | 12 hr |
| 11 | CB1 | 4-Hydrazinophthalic acid hydrochloride | 0.50 | — | 8 | 80 | 12 hr |
| 12 | CB1 | 4-Hydrazinophthalic acid hydrochloride | 0.50 | — | 8 | 85 | 12 hr |
| 13 | CB1 | 4-Hydrazinophthalic acid hydrochloride | 0.50 | — | 8 | 5 | 12 hr |
| 14 | CB1 | 4-Hydrazinophthalic acid hydrochloride | 0.50 | — | 2 | 25 | 12 hr |
| 15 | CB1 | 4-Hydrazinophthalic acid hydrochloride | 0.50 | — | 11 | 25 | 12 hr |
| 16 | CB1 | 4-Hydrazinophthalic acid hydrochloride | 0.50 | — | 8 | 25 | 12 hr |
| 17 | CB1 | 4-Hydrazinobenzoic acid | 1.00 | — | 8 | 25 | 12 hr |
| 18 | CB1 | 4-Hydrazinobenzenesulfonic acid | 1.00 | — | 8 | 25 | 12 hr |
| 19 | CB1 | P-(4-Hydrazinylphenyl) phosphonic acid | 1.00 | — | 8 | 25 | 12 hr |
| 20 | CB1 | P,P'-[[(4-Aminobenzoyl)amino]methylene]-bisphosphonic acid hydrochloride | 0.50 | — | 8 | 25 | 12 hr |
| 21 | CB2 | 4-Hydrazinophthalic acid hydrochloride | 0.50 | — | 8 | 25 | 12 hr |
| 22 | CB3 | 4-Hydrazinophthalic acid hydrochloride | 0.50 | — | 8 | 25 | 12 hr |
| 23 | CB4 | 4-Hydrazinophthalic acid hydrochloride | 0.50 | — | 8 | 25 | 12 hr |
| 24 | CB5 | 4-Hydrazinophthalic acid hydrochloride | 0.50 | — | 8 | 25 | 12 hr |
| 25 | CB1 | 4-Hydrazinophthalic acid hydrochloride | 0.50 | — | 8 | 25 | 1 hr + 5 passes |
| 26 | CB1 | 4-Hydrazinophthalic acid hydrochloride | 0.50 | — | 8 | 25 | 1 hr + 5 passes |
| 27 | CB1 | 4-Hydrazinophthalic acid hydrochloride | 0.50 | — | 8 | 25 | 1 hr + 5 passes |
| 28 | CB1 | 4-Hydrazinophthalic acid hydrochloride | 0.50 | — | 8 | 25 | 12 hr |
| 29 | CB1 | 4-Hydrazinophthalic acid hydrochloride<br>4-Hydrazinobenzoic acid | 0.25<br>0.50 | —<br>— | 8 | 25 | 12 hr |
| 30 | CB1 | 4-Hydrazinophthalic acid hydrochloride<br>P,P'-[[(4-Aminobenzoyl) amino]methylene]-bisphosphonic acid hydrochloride | 0.25<br>0.25 | —<br>— | 8 | 25 | 12 hr |
| 31 | CB1 | 4-Aminophthalic acid | 0.50 | $KNO_2$ | 8 | 25 | 12 hr |
| 32 | CB1 | 4-Aminophthalic acid | 0.50 | — | (*1) | 25 | 12 hr |
| 33 | CB1 | 4-Fluorobenzene sulfonic acid | 1.00 | Hydrazine | 9 | 25 | 8 hr |
| 34 | CB1 | $H_2N-NH-COO-C_6H_4-COOH$ | 1.00 | — | 3 | 25, 80 | 8 hr |
| 35 | PC1 | 4-Hydrazinophthalic acid hydrochloride | 0.50 | — | 8 | 25 | 12 hr |
| 36 | QA | 4-Hydrazinophthalic acid hydrochloride | 0.50 | — | 8 | 25 | 12 hr |
| 37 | AZ | 4-Hydrazinophthalic acid hydrochloride | 0.50 | — | 8 | 25 | 12 hr |
| 38 | PC2 | 4-Hydrazinophthalic acid hydrochloride | 0.50 | — | 8 | 25 | 12 hr |
| 39 | TI | 4-Hydrazinophthalic acid hydrochloride | 0.50 | — | 8 | 25 | 12 hr |
| 40 | CB6 | 4-Aminophthalic acid | 0.14 | $NaNO_2$ | (*1) | 25 | (*2) |
| 41 | CB6 | 4-Aminophthalic acid | 0.29 | $NaNO_2$ | (*1) | 25 | (*2) |
| 42 | CB6 | 4-Aminophthalic acid | 0.43 | $NaNO_2$ | (*1) | 25 | (*2) |
| 43 | CB6 | 4-Aminophthalic acid | 0.57 | $NaNO_2$ | (*1) | 25 | (*2) |
| 44 | CB1 | 4-Aminophthalic acid | 0.65 | $KNO_2$ | (*1) | 25 | 4 hr |
| 45 | CB1 | 2-Aminobenzoic acid | 2.19 | $NaNO_2$ | (*1) | 80 | (*2) |
| 46 | CB1 | 4-Aminobenzenesulfonic acid | 1.73 | $NaNO_2$ | (*1) | 80 | (*2) |
| 47 | CB7 | 4-Hydrazinobenzoic acid | 1.00 | — | 9 | 120 | 24 hr |
| 48 | CB8 | — | — | — | (*1) | 25 | 3 hr |
| 49 | CB1 | — | — | Ozone gas | (*1) | 25 | 8 hr |
| 50 | CB1 | — | — | Sodium hypochlorite | (*1) | 150 | — |
| 51 | CB1 | — | — | Nitric acid | (*1) | 25 | 8 hr |
| 52 | CB9 | 4,4-Azobis(4-Cyanopentanoic acid) | — | Potassium peroxodisulfate | (*1) | 105 | 48 hr |
| 53 | CB9 | — | — | Sodium hypochlorite | (*1) | 25 | 48 hr |
| 54 | Cab-O-Jet 300 | | | | | | |

(*1) No pH adjustment was made.
(*2) Until generation of gas was stopped.

Properties of self-dispersible pigments are shown in Table 2. In Table 2, "Ph" means a phenylene group.

Co., Ltd.) and "NIKKOL BL-9EX" (trade name, product of Nikko Chemicals Co., Ltd.) are nonionic surfactants.

TABLE 2

Properties of self-dispersible pigment

| No. of self-dispersible pigment | Structure of functional group | $D_{50}$ (nm) | $D_{90}$ (nm) | Zeta potential $X_A$ (mV) | Standard deviation of zeta potential $X_\sigma$ | Introduced amount of functional group $Y_A$ (mmol/g) | Standard deviation of introduced amount of functional group $Y_\sigma$ |
|---|---|---|---|---|---|---|---|
| 1 | —Ph—(COOK)$_2$ | 102 | 175 | −88.0 | 8.8 | 0.27 | 0.0270 |
| 2 | —Ph—(COOK)$_2$ | 95 | 165 | −89.0 | 9.1 | 0.26 | 0.0266 |
| 3 | —Ph—(COOK)$_2$ | 89 | 156 | −89.0 | 9.2 | 0.29 | 0.0300 |
| 4 | —Ph—(COOK)$_2$ | 88 | 159 | −85.0 | 9.0 | 0.27 | 0.0286 |
| 5 | —Ph—(COONa)$_2$ | 100 | 165 | −94.0 | 9.8 | 0.26 | 0.0271 |
| 6 | —Ph—(COONH$_4$)$_2$ | 102 | 161 | −95.0 | 8.9 | 0.27 | 0.0253 |
| 7 | —Ph—(COOK)$_2$ | 117 | 189 | −35.0 | 10.5 | 0.09 | 0.0270 |
| 8 | —Ph—(COOK)$_2$ | 114 | 180 | −40.0 | 10.9 | 0.11 | 0.0300 |
| 9 | —Ph—(COOK)$_2$ | 102 | 162 | −93.0 | 8.6 | 0.31 | 0.0287 |
| 10 | —Ph—(COOK)$_2$ | 103 | 158 | −99.0 | 8.8 | 0.35 | 0.0311 |
| 11 | —Ph—(COOK)$_2$ | 107 | 172 | −86.0 | 10.4 | 0.27 | 0.0327 |
| 12 | —Ph—(COOK)$_2$ | 102 | 159 | −83.0 | 10.6 | 0.26 | 0.0332 |
| 13 | —Ph—(COOK)$_2$ | 111 | 168 | −85.0 | 10.5 | 0.27 | 0.0334 |
| 14 | —Ph—(COOK)$_2$ | 110 | 164 | −104.0 | 9.8 | 0.30 | 0.0283 |
| 15 | —Ph—(COOK)$_2$ | 99 | 152 | −85.0 | 10.9 | 0.26 | 0.0333 |
| 16 | —Ph—(COOK)$_2$ | 101 | 162 | −88.0 | 8.5 | 0.29 | 0.0280 |
| 17 | —Ph—COOK | 105 | 175 | −84.0 | 9.3 | 0.24 | 0.0266 |
| 18 | —Ph—SO$_3$K | 98 | 161 | −79.0 | 9.8 | 0.21 | 0.0261 |
| 19 | —Ph—PO$_3$K$_2$ | 102 | 172 | −82.0 | 9.5 | 0.24 | 0.0278 |
| 20 | —Ph—CONH—CH(PO$_3$K$_2$)$_2$ | 98 | 165 | −89.0 | 9.5 | 0.26 | 0.0278 |
| 21 | —Ph—(COOK)$_2$ | 88 | 152 | −95.0 | 8.8 | 0.30 | 0.0278 |
| 22 | —Ph—(COOK)$_2$ | 105 | 172 | −91.0 | 8.3 | 0.26 | 0.0237 |
| 23 | —Ph—(COOK)$_2$ | 97 | 161 | −88.0 | 8.2 | 0.28 | 0.0261 |
| 24 | —Ph—(COOK)$_2$ | 113 | 182 | −81.0 | 8.4 | 0.24 | 0.0249 |
| 25 | —Ph—(COOK)$_2$ | 98 | 165 | −91.0 | 9.0 | 0.26 | 0.0257 |
| 26 | —Ph—(COOK)$_2$ | 112 | 162 | −92.0 | 10.5 | 0.29 | 0.0331 |
| 27 | —Ph—(COOK)$_2$ | 99 | 154 | −92.0 | 10.8 | 0.28 | 0.0329 |
| 28 | —Ph—(COOK)$_2$ | 87 | 159 | −94.0 | 8.2 | 0.31 | 0.0270 |
| 29 | —Ph—(COOK)$_2$ —Ph—COOK | 99 | 151 | −98.0 | 8.4 | 0.32 | 0.0274 |
| 30 | —Ph—(COOK)$_2$ —Ph—CONH—CH(PO$_3$K$_2$)$_2$ | 94 | 167 | −92.0 | 7.9 | 0.32 | 0.0275 |
| 31 | —Ph—(COOK)$_2$ | 92 | 165 | −84.0 | 10.0 | 0.28 | 0.0333 |
| 32 | —Ph—(COOK)$_2$ | 115 | 198 | −83.0 | 12.5 | 0.25 | 0.0377 |
| 33 | —Ph—SO$_3$K | 98 | 175 | −94.0 | 10.6 | 0.29 | 0.0327 |
| 34 | —COO—Ph—COOK | 85 | 155 | −97.0 | 8.6 | 0.29 | 0.0257 |
| 35 | —Ph—(COOK)$_2$ | 107 | 173 | −89.0 | 11.4 | 0.26 | 0.0333 |
| 36 | —Ph—(COOK)$_2$ | 111 | 179 | −79.8 | 12.5 | 0.21 | 0.0329 |
| 37 | —Ph—(COOK)$_2$ | 103 | 181 | −87.4 | 10.1 | 0.23 | 0.0266 |
| 38 | —Ph—(COOK)$_2$ | 81 | 158 | −83.6 | 9.9 | 0.22 | 0.0261 |
| 39 | —Ph—(COOK)$_2$ | 90 | 158 | −52.2 | 14.0 | 0.14 | 0.0375 |
| 40 | —Ph—(COONa)$_2$ | 115 | 182 | −35.1 | 15.8 | 0.09 | 0.0405 |
| 41 | —Ph—(COONa)$_2$ | 114 | 178 | −52.8 | 14.6 | 0.15 | 0.0415 |
| 42 | —Ph—(COONa)$_2$ | 104 | 169 | −60.4 | 13.9 | 0.20 | 0.0460 |
| 43 | —Ph—(COONa)$_2$ | 106 | 166 | −71.5 | 13.8 | 0.24 | 0.0463 |
| 44 | —Ph—(COOK)$_2$ | 99 | 163 | −87.4 | 14.1 | 0.25 | 0.0403 |
| 45 | —Ph—COONa | 98 | 172 | −78.4 | 17.2 | 0.21 | 0.0461 |
| 46 | —Ph—SO$_3$Na | 106 | 186 | −40.5 | 16.1 | 0.12 | 0.0477 |
| 47 | —Ph—COONa | 145 | 212 | −45.0 | 14.5 | 0.16 | 0.0516 |
| 48 | —COONa | 89 | 154 | −76.0 | 13.2 | 0.25 | 0.0434 |
| 49 | —COOK | 110 | 189 | −85.9 | 14.8 | 0.24 | 0.0414 |
| 50 | —COOK | 98 | 168 | −84.3 | 13.9 | 0.24 | 0.0396 |
| 51 | —COOK | 103 | 157 | −90.8 | 14.5 | 0.26 | 0.0415 |
| 52 | —COOK | 130 | 190 | −84.5 | 14.6 | 0.24 | 0.4150 |
| 53 | —COOK | 115 | 184 | −77.2 | 13.8 | 0.26 | 0.4650 |
| 54 | —Ph—(COOK)$_2$ | 95 | 170 | −76.4 | 15.8 | 0.19 | 0.0393 |

Preparation of Ink:

After their corresponding respective components (unit: %) shown in Table 3 were mixed and sufficiently agitated, the resultant mixtures were filtered under pressure through a membrane filter (trade name "HDCII FILTER", product of Pall Corporation) having a pore size of 2.5 μm to prepare respective inks. Polyethylene glycol used had a number-average molecular weight of 600. Both "ACETYLENOL E100" (trade name, product of Kawaken Fine Chemicals Co., Ltd.) and "NIKKOL BL-9EX" (trade name, product of Nikko Chemicals Co., Ltd.) are nonionic surfactants. "Proxel GXL(S)" (trade name, product of Avecia) is a mildewproofing agent. Resins 1 to 4 are resins having the following respective compositions, and the content of the resin (solids) in the respective liquids is 15.0%.

Resin 1 (water-soluble resin): Styrene/α-methylstyrene/acrylic acid terpolymer having an acid value of 160 mg KOH/g;

Resin 2 (resin particle): Styrene/n-butyl methacrylate/acrylic acid terpolymer having an acid value of 30 mg KOH/g;

Resin 3 (water-soluble resin): Isophorone diisocyanate/polytetramethylene glycol (number-average molecular weight: 1,000)/dimethylolpropionic acid terpolymer having an acid value of 80 mg KOH/g;

Resin 4 (resin particle): Isophorone diisocyanate/polytetramethylene glycol (number-average molecular weight: 1,000)/dimethylolpropionic acid terpolymer having an acid value of 30 mg KOH/g.

TABLE 3

Composition of ink

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| self-dispersible pigment No. | 1 | 2 | 3 | 4 | 5 | 6 | 7 | 8 | 9 | 10 | 11 | 12 | 13 | 14 | 15 |
| Aqueous dispersion liquid | 30.00 | 30.00 | 30.00 | 30.00 | 30.00 | 30.00 | 30.00 | 30.00 | 30.00 | 30.00 | 30.00 | 30.00 | 30.00 | 30.00 | 30.00 |
| Glycerol | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | | | | | | | | | | | | | | | |
| Polyethylene glycol 600 | | | | | | | | | | | | | | | |
| Triethylene glycol monobutyl ether | | | | | | | | | | | | | | | |
| 1,2-Hexanediol | | | | | | | | | | | | | | | |
| 1,5-Pentanediol | | | | | | | | | | | | | | | |
| 5,5-Dimethylhydantoin | | | | | | | | | | | | | | | |
| Potassium phthalate | 0.20 | 0.20 | 0.20 | 0.20 | | | 0.20 | 0.20 | 0.20 | 0.20 | 0.20 | 0.20 | 0.20 | 0.20 | 0.20 |
| Sodium phthalate | | | | | 0.20 | | | | | | | | | | |
| Ammonium phthalate | | | | | | 0.20 | | | | | | | | | |
| Potassium benzoate | | | | | | | | | | | | | | | |
| Liquid containing Resin 1 | | | | | | | | | | | | | | | |
| Liquid containing Resin 2 | | | | | | | | | | | | | | | |
| Liquid containing Resin 3 | | | | | | | | | | | | | | | |
| Liquid containing Resin 4 | | | | | | | | | | | | | | | |
| ACETYLENOL E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| NIKKOL BL-9EX | | | | | | | | | | | | | | | |
| Triethanolamine | | | | | | | | | | | | | | | |
| ProxelGXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 47.45 | 47.45 | 47.45 | 47.45 | 47.45 | 47.45 | 47.45 | 47.45 | 47.45 | 47.45 | 47.45 | 47.45 | 47.45 | 47.45 | 47.45 |

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| self-dispersible pigment No. | 16 | 17 | 18 | 19 | 20 | 21 | 22 | 23 | 24 | 25 | 26 | 27 | 28 | 29 | 30 |
| Aqueous dispersion liquid | 30.00 | 30.00 | 30.00 | 30.00 | 30.00 | 30.00 | 30.00 | 30.00 | 30.00 | 30.00 | 30.00 | 30.00 | 30.00 | 30.00 | 30.00 |
| Glycerol | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | | | | | | | | | | | | | | | |
| Polyethylene glycol 600 | | | | | | | | | | | | | | | |
| Triethylene glycol monobutyl ether | | | | | | | | | | | | | | | |
| 1,2-Hexanediol | | | | | | | | | | | | | | | |
| 1,5-Pentanediol | | | | | | | | | | | | | | | |
| 5,5-Dimethylhydantoin | | | | | | | | | | | | | | | |
| Potassium phthalate | 0.20 | | 0.20 | 0.20 | 0.20 | 0.20 | 0.20 | 0.20 | 0.20 | 0.20 | 0.20 | 0.20 | 0.20 | 0.20 | 0.20 |
| Sodium phthalate | | | | | | | | | | | | | | | |
| Ammonium phthalate | | | | | | | | | | | | | | | |
| Potassium benzoate | | 0.20 | | | | | | | | | | | | | |
| Liquid containing Resin 1 | | | | | | | | | | | | | | | |
| Liquid containing Resin 2 | | | | | | | | | | | | | | | |
| Liquid containing Resin 3 | | | | | | | | | | | | | | | |
| Liquid containing Resin 4 | | | | | | | | | | | | | | | |
| ACETYLENOL E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| NIKKOL BL-9EX | | | | | | | | | | | | | | | |
| Triethanolamine | | | | | | | | | | | | | | | |
| ProxelGXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 47.45 | 47.45 | 47.45 | 47.45 | 47.45 | 47.45 | 47.45 | 47.45 | 47.45 | 47.45 | 47.45 | 47.45 | 47.45 | 47.45 | 47.45 |

| | Example | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| self-dispersible pigment No. | 31 | 32 | 33 | 34 | 35 | 36 | 37 | 38 | 39 | 40 | 41 | 42 | 43 | 44 | 45 |
| Aqueous dispersion liquid | 30.00 | 30.00 | 30.00 | 30.00 | 30.00 | 30.00 | 30.00 | 30.00 | 30.00 | 30.00 | 30.00 | 30.00 | 30.00 | 30.00 | 30.00 |

TABLE 3-continued

| Composition of ink | | | | | | | | | | | | | | | |
|---|---|---|---|---|---|---|---|---|---|---|---|---|---|---|---|
| Glycerol | 7.00 | 7.00 | 7.00 | 7.00 | 7.00 | 7.00 | 7.00 | 7.00 | 7.00 | 10.00 | 10.00 | 10.00 | 10.00 | 10.00 | 10.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | | 5.00 | 5.00 |
| Trimethylolpropane | 5.00 | 5.00 | 5.00 | 5.00 | 5.00 | 5.00 | 5.00 | 5.00 | 5.00 | 3.00 | | 3.00 | 5.00 | | 3.00 |
| Triethylene glycol | 5.00 | 5.00 | 5.00 | 5.00 | 5.00 | 5.00 | 5.00 | 5.00 | 5.00 | 5.00 | | | 5.00 | 5.00 | |
| Diethylene glycol | | | | | | | | | | | 5.00 | | | | |
| Polyethylene glycol 600 | | | | | | | | | | | 3.00 | | | | |
| Triethylene glycol monobutyl ether | | | | | | | | | | | | 5.00 | | | |
| 1,2-Hexanediol | | | | | | | | | | | | | 3.00 | | |
| 1,5-Pentanediol | | | | | | | | | | | | | | 3.00 | |
| 5,5-Dimethylhydantoin | | | | | | | | | | | | | | | 5.00 |
| Potassium phthalate | 0.20 | 0.20 | 0.20 | 0.20 | | | | | | 0.20 | 0.20 | 0.20 | 0.20 | 0.20 | 0.20 |
| Sodium phthalate | | | | | | | | | | | | | | | |
| Ammonium phthalate | | | | | | | | | | | | | | | |
| Potassium benzoate | | | | | | | | | | | | | | | |
| Liquid containing Resin 1 | | | | | | | | | | | | | | | |
| Liquid containing Resin 2 | | | | | | | | | | | | | | | |
| Liquid containing Resin 3 | | | | | | | | | | | | | | | |
| Liquid containing Resin 4 | | | | | | | | | | | | | | | |
| ACETYLENOL E100 | 0.15 | 0.15 | 0.15 | 0.15 | 0.50 | 0.50 | 0.50 | 0.50 | 0.50 | 0.15 | 0.15 | 0.15 | 0.15 | 0.15 | 0.15 |
| NIKKOL BL-9EX | | | | | | | | | | | | | | | |
| Triethanolamine | | | | | | | | | | | | | | | |
| ProxelGXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 47.45 | 47.45 | 47.45 | 47.45 | 47.30 | 47.30 | 47.30 | 47.30 | 47.30 | 46.45 | 46.45 | 46.45 | 46.45 | 46.45 | 46.45 |

| | Example | | | | | | | | | | | | |
|---|---|---|---|---|---|---|---|---|---|---|---|---|---|
| | 46 | 47 | 48 | 49 | 50 | 51 | 52 | 53 | 54 | 55 | 56 | 57 | 58 |
| self-dispersible pigment No. | 1 | 1 | 1 | 1 | 1 | 1 | 1 | 1 | 1 | 1 | 6 | 10 | 17 |
| Aqueous dispersion liquid | 30.00 | 30.00 | 30.00 | 30.00 | 30.00 | 30.00 | 30.00 | 30.00 | 30.00 | 30.00 | 30.00 | 30.00 | 30.00 |
| Glycerol | 10.00 | 10.00 | 10.00 | 10.00 | 10.00 | 10.00 | 10.00 | 10.00 | 10.00 | 10.00 | 10.00 | 10.00 | 10.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 3.00 | 3.00 | 3.00 | 3.00 | 3.00 | 3.00 | 3.00 | 3.00 | 3.00 | 3.00 | 3.00 | 3.00 | 3.00 |
| Triethylene glycol | 5.00 | 5.00 | 5.00 | 5.00 | 5.00 | 5.00 | 5.00 | 5.00 | 5.00 | 5.00 | 5.00 | | 3.00 |
| Diethylene glycol | | | | | | | | | | | | 2.00 | |
| Polyethylene glycol 600 | | | | | | | | | | | | | 2.00 |
| Triethylene glycol monobutyl ether | | | | | | | | | | | | 3.00 | |
| 1,2-Hexanediol | | 1.00 | | | | | | | | | | | |
| 1,5-Pentanediol | | | | | | | | | | | | | |
| 5,5-Dimethylhydantoin | | | | | | | | | | | | | |
| Potassium phthalate | | | 0.20 | | 0.20 | 0.20 | 0.20 | 0.20 | 0.20 | 0.20 | 0.20 | 0.20 | 0.20 |
| Sodium phthalate | | 0.20 | | | | | | | | | | | |
| Ammonium phthalate | | | 0.40 | | | | | | | | | | |
| Potassium benzoate | | | | 0.40 | | | | | | | | | 0.20 |
| Liquid containing Resin 1 | | | | | 6.70 | | | | | | 3.30 | | |
| Liquid containing Resin 2 | | | | | | 6.70 | | | | | | | |
| Liquid containing Resin 3 | | | | | | | 6.70 | | | | | | |
| Liquid containing Resin 4 | | | | | | | | 6.70 | | | | | |
| ACETYLENOL E100 | 0.15 | 0.15 | 0.15 | 0.15 | 0.15 | 0.15 | 0.15 | 0.15 | | 0.15 | 0.15 | 0.15 | 0.15 |
| NIKKOL BL-9EX | | | | | | | | | 0.20 | | | | |
| Triethanolamine | | | | | | | | | | 0.30 | | | |
| ProxelGXL(S) | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 45.65 | 46.45 | 46.25 | 46.25 | 39.75 | 39.75 | 39.75 | 39.75 | 46.40 | 46.15 | 43.15 | 46.45 | 46.25 |

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| self-dispersible pigment No. | 40 | 41 | 42 | 43 | 44 | 45 | 46 | 47 | 48 | 49 | 50 | 51 | 52 | 53 | 54 |
| Aqueous dispersion liquid | 30.00 | 30.00 | 30.00 | 30.00 | 30.00 | 30.00 | 30.00 | 30.00 | 30.00 | 30.00 | 30.00 | 30.00 | 30.00 | 30.00 | 30.00 |
| Glycerol | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | | | | | | | | | | | | | | | |
| Polyethylene glycol 600 | | | | | | | | | | | | | | | |
| Triethylene glycol monobutyl ether | | | | | | | | | | | | | | | |
| 1,2-Hexanediol | | | | | | | | | | | | | | | |
| 1,5-Pentanediol | | | | | | | | | | | | | | | |
| 5,5-Dimethylhydantoin | | | | | | | | | | | | | | | |
| Potassium phthalate | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Sodium phthalate | | | | | | | | | | | | | | | |
| Ammonium phthalate | | | | | | | | | | | | | | | |
| Potassium benzoate | | | | | | | | | | | | | | | |
| Liquid containing Resin 1 | | | | | | | | | | | | | | | |
| Liquid containing Resin 2 | | | | | | | | | | | | | | | |

TABLE 3-continued

| Composition of ink | | | | | | | | | | | | | | | |
|---|---|---|---|---|---|---|---|---|---|---|---|---|---|---|---|
| Liquid containing Resin 3 | | | | | | | | | | | | | | | |
| Liquid containing Resin 4 | | | | | | | | | | | | | | | |
| ACETYLENOL E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| NIKKOL BL-9EX | | | | | | | | | | | | | | | |
| Triethanolamine | | | | | | | | | | | | | | | |
| ProxelGXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 47.45 | 47.45 | 47.45 | 47.45 | 47.45 | 47.45 | 47.45 | 47.45 | 47.45 | 47.45 | 47.45 | 47.45 | 47.45 | 47.45 | 47.45 |

Evaluation:

The respective inks obtained above were used to make the following evaluations. In the present invention, in the evaluation criteria of the following respective evaluation items, "AA", "A" and "B" were regarded as allowable levels, and "C", "D" and "E" were regarded as unallowable levels. Evaluation results are shown in Table 4.

Uniformity of Image:

Each ink obtained above was charged into an ink cartridge, and the ink cartridge was installed in an ink jet recording apparatus (trade name "PIXUS MP480", manufactured by Canon Inc.) in which the ink is ejected from a recording head by the action of thermal energy. In the above ink jet recording apparatus, an image recorded under conditions that resolution is 600 dpi×600 dpi, and an ink droplet whose mass is 25 ng±10% is applied to a unit region of 1/600 inch×1/600 inch is defined as "its recording duty being 100%". A 2 cm×2 cm solid image whose recording duty is 100% was recorded on the following four recording media (plain paper) to obtain recorded articles.
(1) Trade name "GF-500" (product of Canon Inc.),
(2) Trade name "SW-101" (product of Canon Inc.),
(3) Trade name "Xerox 4200 Premium Multipurpose White Paper" (product of Xerox Corporation), and
(4) Trade name "Bright White Inkjet Paper" (product of Hewlett-Packard Co.).

The uniformity of the solid image in each of the recorded articles thus obtained was visually observed to evaluate the uniformity of the image according to the following evaluation criterion.
AA: The uniformity of the image was good in each of the four recording media;
A: The uniformity of the image was good in three recording media, but white blur that are unnoticeable occurred in one recording medium;
B: The uniformity of the image was good in two recording media, but white blur that are unnoticeable occurred in two recording medium;
C: The uniformity of the image was good in one recording media, but white blur that are unnoticeable occurred in three recording media;
D: White blur that are unnoticeable occurred in all the four recording media; and
E: White blur that are noticeable occurred in at least one recording medium.

Storage Stability of Ink:

Each of the inks obtained above was placed in a closed container and stored for 2 weeks in a thermostat controlled to 70° C. A rate of change of the viscosity of the ink and a rate of change of the average particle size of the self-dispersible pigment before and after the storage were determined to evaluate the storage stability of the ink according to the following criterion. The viscosity of the ink was measured at 25° C. by means of an E-type viscometer (trade name "RE-80L", manufactured by TOKI SANGYO CO., LTD.). In addition, the average particle size of the self-dispersible pigment was determined by measuring a 50% cumulative value in the volume-based particle size distribution under the same conditions as described above.
AA: Both rate of change of the viscosity and rate of change of the average particle size were 10% or less;
A: One of the rate of change of the viscosity and the rate of change of the average particle size was 10% or less, and the other was more than 10% and 15% or less;
B: Both rate of change of the viscosity and rate of change of the average particle size were more than 10% and 15% or less;
C: One of the rate of change of the viscosity and the rate of change of the average particle size was more than 10% and 15% or less, and the other was more than 15%;
D: Both rate of change of the viscosity and rate of change of the average particle size were more than 15%.

TABLE 4

| Evaluation results | | | |
|---|---|---|---|
| | | Uniformity of image | Storage stability of ink |
| Example | 1 | AA | AA |
| | 2 | AA | AA |
| | 3 | AA | AA |
| | 4 | AA | AA |
| | 5 | AA | AA |
| | 6 | AA | AA |
| | 7 | AA | A |
| | 8 | AA | AA |
| | 9 | AA | AA |
| | 10 | AA | AA |
| | 11 | AA | AA |
| | 12 | A | AA |
| | 13 | A | AA |
| | 14 | AA | AA |
| | 15 | A | AA |
| | 16 | AA | AA |
| | 17 | AA | AA |
| | 18 | AA | AA |
| | 19 | AA | AA |
| | 20 | AA | AA |
| | 21 | AA | AA |
| | 22 | AA | AA |
| | 23 | AA | AA |
| | 24 | AA | AA |
| | 25 | AA | AA |
| | 26 | A | AA |
| | 27 | AA | AA |
| | 28 | AA | AA |
| | 29 | AA | AA |
| | 30 | AA | AA |
| | 31 | B | B |
| | 32 | B | B |
| | 33 | B | B |
| | 34 | B | B |
| | 35 | A | AA |
| | 36 | A | AA |
| | 37 | A | AA |

TABLE 4-continued

Evaluation results

|   |    | Uniformity of image | Storage stability of ink |
|---|----|----|----|
|   | 38 | A  | AA |
|   | 39 | A  | AA |
|   | 40 | AA | AA |
|   | 41 | AA | AA |
|   | 42 | AA | AA |
|   | 43 | AA | AA |
|   | 44 | AA | AA |
|   | 45 | AA | AA |
|   | 46 | AA | AA |
|   | 47 | AA | AA |
|   | 48 | AA | AA |
|   | 49 | AA | AA |
|   | 50 | AA | AA |
|   | 51 | AA | AA |
|   | 52 | AA | AA |
|   | 53 | AA | AA |
|   | 54 | AA | AA |
|   | 55 | AA | AA |
|   | 56 | AA | AA |
|   | 57 | AA | AA |
|   | 58 | AA | AA |
| Comp. Ex. | 1  | C | C |
|   | 2  | C | C |
|   | 3  | D | B |
|   | 4  | D | B |
|   | 5  | C | C |
|   | 6  | D | B |
|   | 7  | D | C |
|   | 8  | D | C |
|   | 9  | E | D |
|   | 10 | E | D |
|   | 11 | E | D |
|   | 12 | E | D |
|   | 13 | E | D |
|   | 14 | E | D |
|   | 15 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133779, filed Jun. 30, 2014, which is hereby incorporated by reference herein in its entirety.

What is claimed is:

1. An aqueous ink comprising a coloring material, wherein the coloring material is a self-dispersible pigment in which a functional group comprising an anionic group and another atomic group are bonded to a particle surface of the pigment, and a standard deviation of an introduced amount of the functional group is 0.0380 or less.

2. The aqueous ink according to claim 1, wherein the standard deviation of the introduced amount of the functional group is 0.0330 or less.

3. The aqueous ink according to claim 1, wherein the introduced amount of the functional group is 0.10 mmol/g or more.

4. The aqueous ink according to claim 1, wherein the anionic group is at least one selected from the group consisting of a carboxylic acid group, a sulfonic acid group, a phosphoric acid group and a phosphonic acid group.

5. The aqueous ink according to claim 1, wherein the pigment is at least one selected from the group consisting of carbon black and an organic pigment.

6. The aqueous ink according to claim 1, wherein the functional group has a structure represented by —R—$(COOM_1)_n$, in which R is another atomic group, $M_1$ is a hydrogen atom, an alkali metal, ammonium or organic ammonium, and n is an integer of 2 or more.

7. The aqueous ink according to claim 1, wherein the self-dispersible pigment is produced by bonding a group $R_1$ in the following general formula (1) to a particle surface of the pigment by radical addition reaction induced by removal of a hydrogen atom from a compound represented by the general formula (1):

$$HN=N—R_1 \tag{1}$$

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group.

8. The aqueous ink according to claim 1, wherein the self-dispersible pigment is produced by bonding a functional group containing an anionic group to a particle surface of the pigment by radical addition reaction induced by halogen removal from a compound represented by the following general formula (2) by employing a compound represented by the following general formula (3):

wherein $R_1$ is a halogen atom, $R_2$ is an aryl or heteroaryl group, $R_3$ is a hydrogen atom, a nitro, cyano or tosyl group, or a halogen atom, x is an integer of 1 or more, $R_4$ is at least one linking group selected from the group consisting of alkylene, carbonyl, ester and amide groups, y is 0 or 1, $R_5$ is at least one anionic group selected from the group consisting of a carboxylic acid group, a sulfonic acid group, a phosphoric acid group and a phosphonic acid group, z is an integer of 1 or more, and x +z is equal to the number of hydrogen atoms that $R_2$ can have;

$$(R_7)_n—N—N—(R_7)_n \tag{3}$$

wherein each $R_7$ is independently a hydrogen atom or an alkyl group, and each n is independently 1 or 2.

9. The aqueous ink according to claim 1, wherein the self-dispersible pigment is produced by bonding a functional group containing an anionic group to a particle surface of the pigment by causing at least one treatment agent selected from the group consisting of a compound represented by the general formula (4), a compound represented by the general formula (5) and a compound represented by the general formula (6) to react with the particle surface of the pigment:

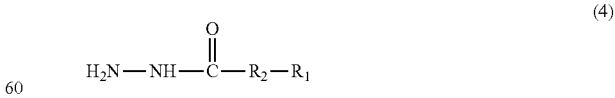

wherein $R_1$ is a group having at least one of an aliphatic group and an aromatic group and being substituted with at least one anionic group selected from the group consisting of a carboxylic acid group, a sulfonic acid group, a phosphoric acid group and a phosphonic acid group, and $R_2$ is an oxygen atom or NH;

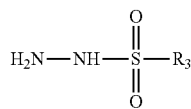

(5)

wherein $R_3$ is a group having at least one of an aliphatic group and an aromatic group and being substituted with at least one anionic group selected from the group consisting of a carboxylic acid group, a sulfonic acid group, a phosphoric acid group and a phosphonic acid group;

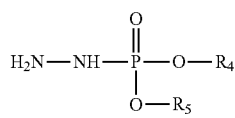

(6)

wherein $R_4$ and $R_5$ are, independently of each other, a group having at least one of an aliphatic group and an aromatic group and being substituted with at least one anionic group selected from the group consisting of a carboxylic acid group, a sulfonic acid group, a phosphoric acid group and a phosphonic acid group.

10. An ink cartridge comprising an ink and an ink storage portion storing the ink, wherein the ink comprises the ink according to claim 1.

11. An ink jet recording method comprising ejecting an ink from a recording head of an ink jet system to record an image on a recording medium, wherein the ink comprises the ink according to claim 1.

12. The aqueous ink according to claim 1, wherein the standard deviation of the introduced amount of the functional group is 0.0000 or more.

13. The aqueous ink according to claim 1, wherein the standard deviation of the introduced amount of the functional group is 0.0200 or more.

14. The aqueous ink according to claim 1, wherein the introduced amount of the functional group is 1.00 mmol/g or less.

15. The aqueous ink according to claim 1, wherein the introduced amount of the functional group is 0.80 mmol/g or less.

16. The aqueous ink according to claim 1, wherein an average particle size ($D_{50}$) of the pigment is 60 nm or more and 120 nm or less.

17. The aqueous ink according to claim 1, wherein an average particle size ($D_{90}$) of the pigment is 100 nm or more and 300 nm or less.

18. The aqueous ink according to claim 1, wherein a content (% by mass) of the self-dispersible pigment in the ink is 0.10% by mass or more and 15.00% by mass or less.

19. The aqueous ink according to claim 1, wherein the anionic group is bonded to the particle surface of the pigment through the another atomic group.

20. The aqueous ink according to claim 1, wherein a structure of the functional group is —R—$(COOM_1)_n$, in which R is the another atomic group, $M_1$ is a hydrogen atom, an alkali metal, ammonium, or organic ammonium, and n is an integer of 2 or more.

* * * * *